United States Patent
Jeong et al.

(10) Patent No.: US 9,869,768 B2
(45) Date of Patent: Jan. 16, 2018

(54) DEVICE FOR DETECTING DISTANCE AND APPARATUS FOR PROCESSING IMAGES COMPRISING SAME

(71) Applicant: LG ELECTRONICS INC., Seoul (KR)

(72) Inventors: Pil Won Jeong, Seoul (KR); Jeong Soo Lee, Seoul (KR); Yong Ho Cho, Seoul (KR); Sang Keun Lee, Seoul (KR); Nak Hoon Go, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 237 days.

(21) Appl. No.: 14/759,877

(22) PCT Filed: Dec. 31, 2013

(86) PCT No.: PCT/KR2013/012435
§ 371 (c)(1),
(2) Date: Jul. 8, 2015

(87) PCT Pub. No.: WO2014/109504
PCT Pub. Date: Jul. 17, 2014

(65) Prior Publication Data
US 2015/0355332 A1  Dec. 10, 2015

(30) Foreign Application Priority Data

Jan. 9, 2013 (KR) .................. 10-2013-0002563
Jan. 14, 2013 (KR) .................. 10-2013-0004026
Feb. 15, 2013 (KR) .................. 10-2013-0016146

(51) Int. Cl.
*G01S 17/89* (2006.01)
*G01S 17/32* (2006.01)
(Continued)

(52) U.S. Cl.
CPC ............ *G01S 17/89* (2013.01); *G01B 11/026* (2013.01); *G01B 11/24* (2013.01); *G01S 7/4817* (2013.01);
(Continued)

(58) Field of Classification Search
None
See application file for complete search history.

(56) References Cited

U.S. PATENT DOCUMENTS 6,819,407 B2    11/2004  Arita et al.
2010/0153062 A1*  6/2010  Maltseff .................. G01S 17/36
                                                    702/159

(Continued)

FOREIGN PATENT DOCUMENTS

KR   10-2010-0124001 A   11/2010
KR   10-2012-0111013 A   10/2012

OTHER PUBLICATIONS

Gokturk, S. Burak, Hakan Yalcin, and Cyrus Bamji. "A time-of-flight depth sensor-system description, issues and solutions." Computer Vision and Pattern Recognition Workshop, 2004. CVPRW'04. Conference on. IEEE, 2004.*

(Continued)

*Primary Examiner* — Zhengxi Liu
(74) *Attorney, Agent, or Firm* — Birch, Stewart, Kolasch & Birch, LLP

(57) ABSTRACT

The present invention relates to a device for detecting distance and an apparatus for processing images comprising same. The device for detecting distance according to one embodiment of the present invention, comprises: a light source portion for outputting an output light based on a plurality of transmission signals having different frequencies; a scanner for sequentially scanning in a first direction and then a second direction to output the output light into an (Continued)

external area; a detection portion for converting received light, which corresponds to the output light and is received from the outside, into reception signals; and a processor for calculating distance to an external object and varying the frequency of the transmission signals, based on the plurality of transmission signals and the plurality of reception signals, wherein the processor calculates a first distance to the external object based on a first transmission signal from among the plurality of transmission signals and a first reception signal corresponding to the first transmission signal, calculates a second distance to the external object based on a second transmission signal from among the plurality of transmission signals and a second reception signal corresponding to the second transmission signal, and calculates a final distance to the external object based on the first and second distances that have been calculated. As a result, the distance to the external object can be accurately detected.

18 Claims, 32 Drawing Sheets

(51) Int. Cl.
| | | |
|---|---|---|
| *G01B 11/24* | (2006.01) | |
| *G01B 11/02* | (2006.01) | |
| *G01S 7/481* | (2006.01) | |
| *G01S 17/36* | (2006.01) | |
| *G01S 17/42* | (2006.01) | |
| *G09G 3/00* | (2006.01) | |

(52) U.S. Cl.
CPC .......... *G01S 17/325* (2013.01); *G01S 17/36* (2013.01); *G01S 17/42* (2013.01); *G09G 3/002* (2013.01)

(56) References Cited

U.S. PATENT DOCUMENTS

| 2011/0188028 A1* | 8/2011 | Hui .................... G01C 3/08 356/5.01 |
| 2011/0279648 A1* | 11/2011 | Lutian .............. G01S 7/4817 348/46 |
| 2012/0062867 A1 | 3/2012 | Shibatani |
| 2012/0249740 A1 | 10/2012 | Lee et al. |
| 2012/0314037 A1* | 12/2012 | Nehmadi .......... G01C 11/06 348/48 |
| 2013/0242405 A1* | 9/2013 | Gupta ............ G02B 27/0172 359/631 |
| 2014/0152975 A1* | 6/2014 | Ko .................... G01S 17/89 356/5.01 |
| 2014/0333728 A1* | 11/2014 | Navab ................ G01S 7/497 348/47 |

OTHER PUBLICATIONS

Jongenelen, Adrian PP, et al. "Analysis of errors in tof range imaging with dual-frequency modulation." IEEE transactions on instrumentation and measurement 60.5 (2011): 1861-1868.*

* cited by examiner

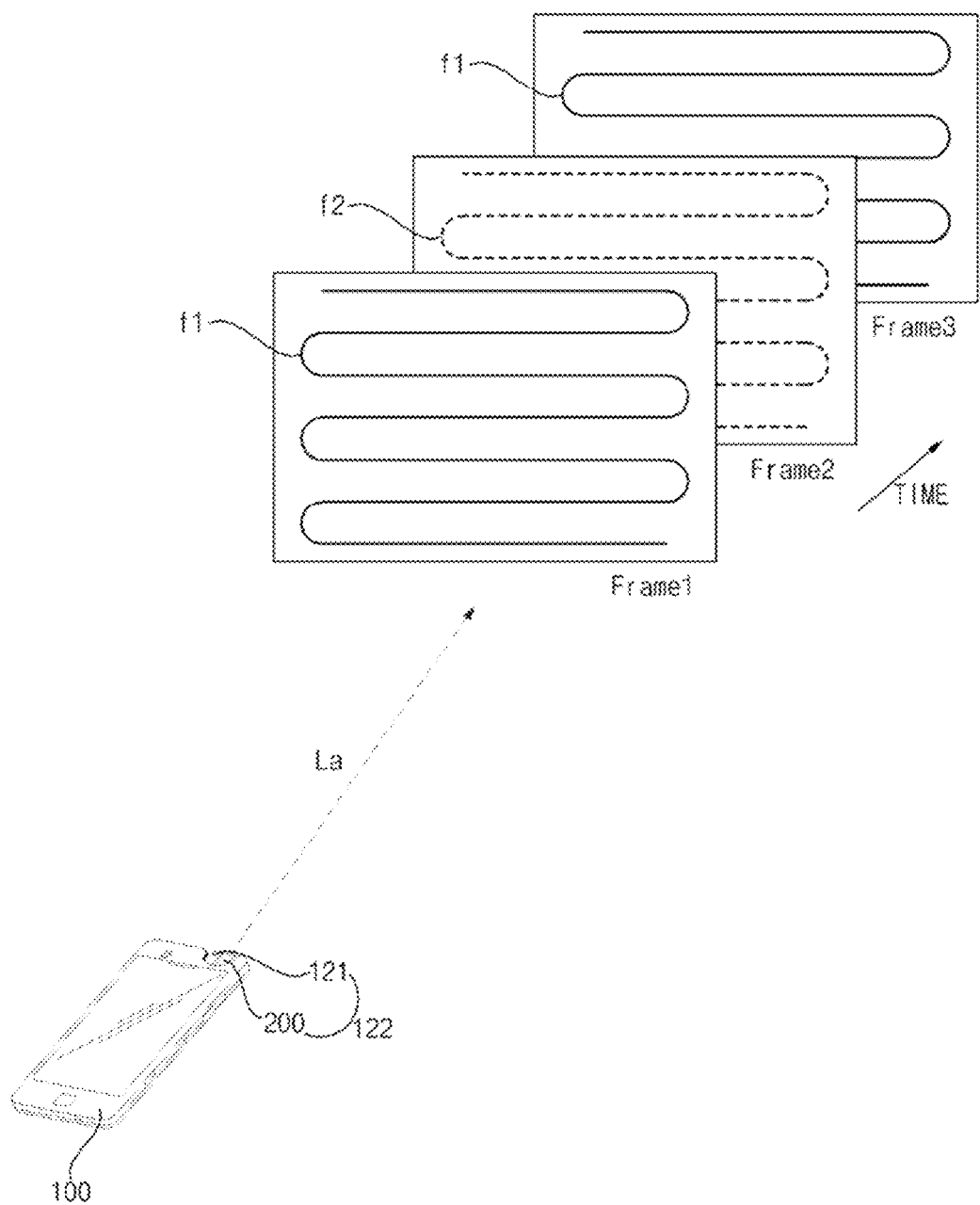

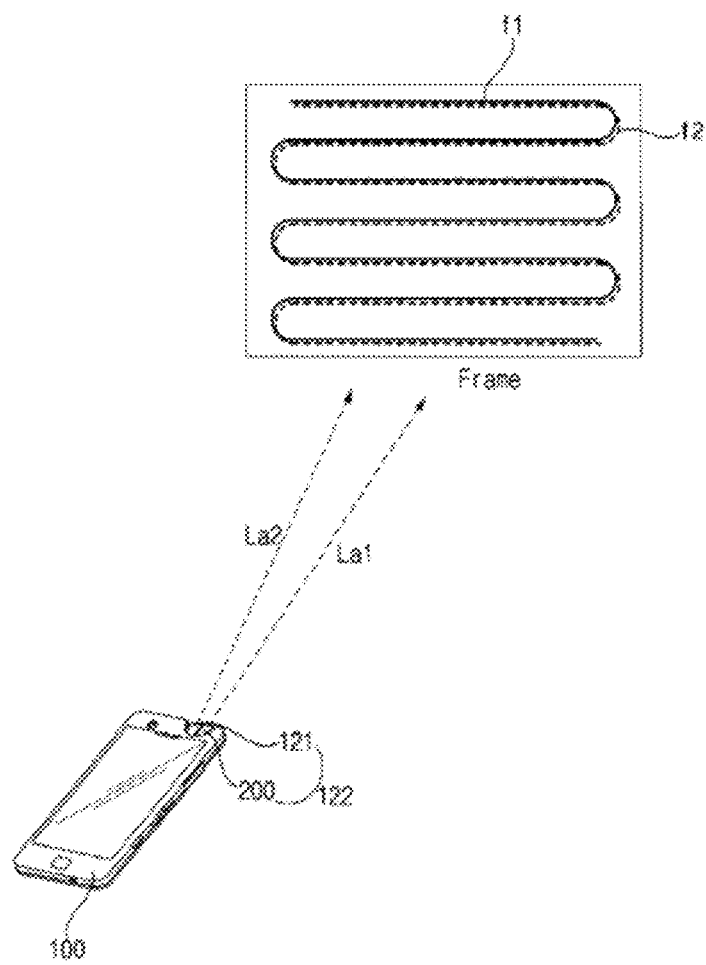

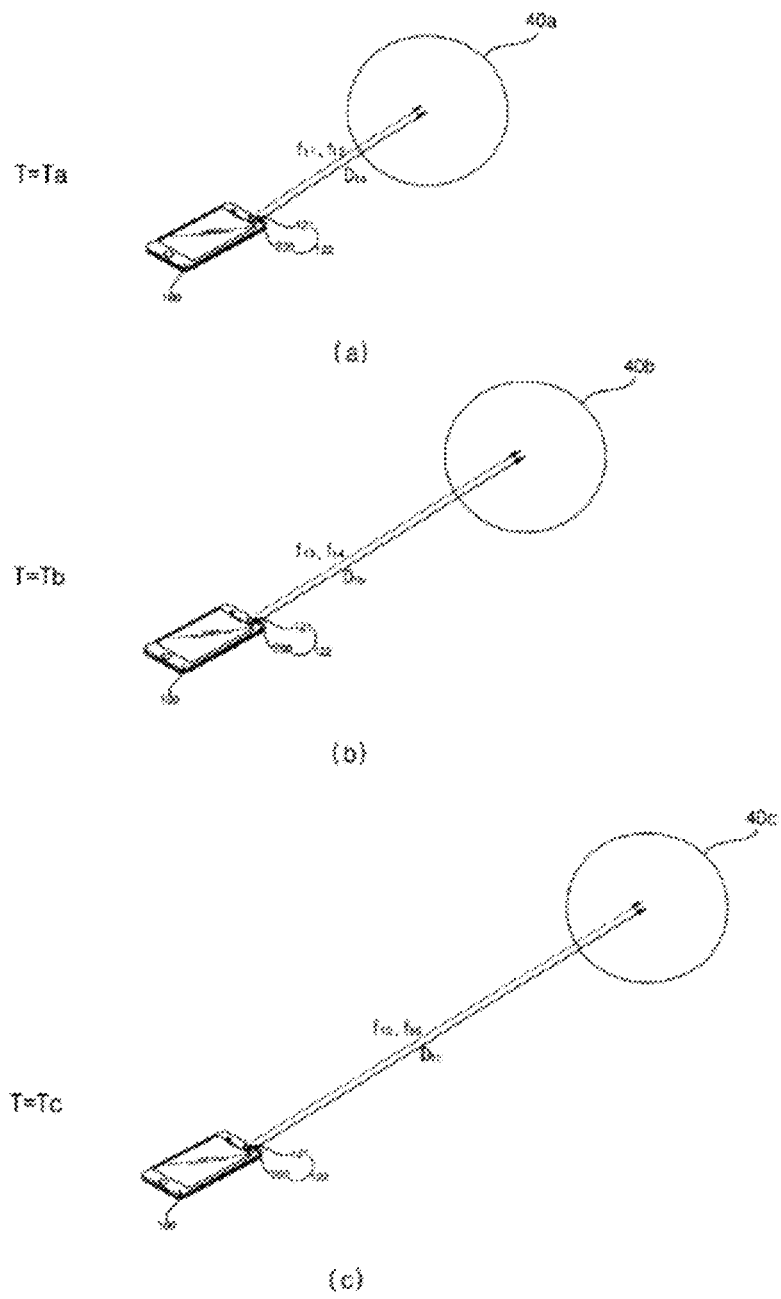

DEVICE FOR DETECTING DISTANCE AND APPARATUS FOR PROCESSING IMAGES COMPRISING SAME

CROSS REFERENCE TO RELATED APPLICATIONS

This application is the National Phase of PCT International Application No. PCT/KR2013/012435, filed on Dec. 31, 2013, which claims priority under 35 U.S.C. 119 (a) to patent application Nos. 10-2013-0002563, filed in the Republic of Korea on Jan. 9, 2013, 10-2013-0004026, filed in the Republic of Korea on Jan. 14, 2013 and 10-2013-0016146, filed in the Republic of Korea on Feb. 15, 2013, all of which are hereby expressly incorporated by reference into the present application.

TECHNICAL FIELD

The present invention relates to a distance detecting device and an image processing apparatus including the same, and more particularly to a distance detecting device that is capable of accurately detecting the distance to an external target and an image processing apparatus including the same.

BACKGROUND ART

A request to measure the distance to an external target has been increased. In particular, during viewing of an image, a request to view a three-dimensional (3D) image, i.e. a stereoscopic image, in addition to a two-dimensional (2D) image has been increased. The distance to an external target may be detected to detect the depth of a 3D image. Various methods of detecting the distance to an external target have been tried.

DISCLOSURE

Technical Problem

It is an object of the present invention to provide a distance detecting device that is capable of accurately detecting the distance to an external target and an image processing apparatus including the same.

Technical Solution

In accordance with an aspect of the present invention, the above and other objects can be accomplished by the provision of a distance detecting device including a light source configured to output light based on a plurality of transmission signals having different frequencies, a scanner configured to sequentially perform first direction scanning and second direction scanning to output the output light to an external area, a detection unit configured to convert light received from an outside into reception signals, the received light corresponding to the output light, and a processor configured to calculate a distance to an external target based on the transmission signals and the reception signals, the processor varying frequencies of the transmission signals, wherein the processor calculates a first distance to the external target based on a first transmission signal, selected from among the transmission signals, and a first reception signal corresponding to the first transmission signal, calculates a second distance to the external target based on a second transmission signal, selected from among the transmission signals, and a second reception signal corresponding to the second transmission signal, and calculates a final distance to the external target based on the calculated first and second distances.

In accordance with another aspect of the present invention, there is provided a distance detecting device including a light source configured to output light, a modulation unit configured to drive the light source unit to output light based on at least one code signal, an output unit configured to output the output light to an outside, a demodulation unit configured to separate the code signal based on light received from the outside, the received light corresponding to the output light, a detection unit configured to convert the received light into an electric signal and to output the converted electric signal to the demodulation unit, and a processor configured to detect a distance to an external target based on the code signal for the modulation unit and the code signal for the demodulation unit.

In accordance with a further aspect of the present invention, there is provided an image processing apparatus including a display unit, a distance detecting unit including a light source configured to output light based on a plurality of transmission signals having different frequencies, a scanner configured to sequentially perform first direction scanning and second direction scanning to output the output light to an external area, a detection unit configured to convert light received from an outside into reception signals, the received light corresponding to the output light, and a processor configured to calculate a distance to an external target based on the transmission signals and the reception signals, the processor varying frequencies of the transmission signals, and a controller configured to control a three-dimensional (3D) image to be displayed on the display unit using distance information detected by the distance detecting unit, wherein the processor calculates a first distance to the external target based on a first transmission signal, selected from among the transmission signals, and a first reception signal corresponding to the first transmission signal, calculates a second distance to the external target based on a second transmission signal, selected from among the transmission signals, and a second reception signal corresponding to the second transmission signal, and calculates a final distance to the external target based on the calculated first and second distances.

Advantageous Effects

A distance detecting device according to an embodiment of the present invention or an image processing apparatus including the distance detecting device outputs light based on a plurality of transmission signals having different frequencies, and convert light, corresponding to the output light, received from the outside, into reception signals to calculate the distance to an external target. In particular, the distance detecting device or the image processing apparatus including the distance detecting device calculates a first distance to the external target based on a first transmission signal, selected from among the transmission signals, and a first reception signal corresponding to the first transmission signal, calculates a second distance to the external target based on a second transmission signal, selected from among the transmission signals, and a second reception signal corresponding to the second transmission signal, and calculates a final distance to the external target based on the calculated first and second distances. Consequently, it is possible to accurately measure the distance to the external target.

In particular, a frequency ratio between the first and second transmission signals, selected from among the transmission signals, is set not to be an integer multiple such that, when the light is output, it is possible to maintain distance resolution while increasing a measurable distance to the external target. Consequently, it is possible to improve the performance of the distance detecting device.

Meanwhile, a wavelength of a first output light based on the first transmission signal, selected from among the transmission signals, may be different from a wavelength of a second output light based on the second transmission signal, selected from among the transmission signals. The first output light and the second output light may be alternately output per line or per frame during scanning performed by a scanner. Consequently, it is possible to accurately measure the distance to the external target.

Meanwhile, the light source unit may output a first light based on the first and second transmission signals for a first time, and may output a second light based on third and fourth transmission signals for a second time. That is, transmission signals having different frequencies may be used at different times, thereby increasing a measurable distance.

Meanwhile, a two-dimensional (2D) scanner that is capable of sequentially performing first directional scanning and second directional scanning may be used to output the light to the outside. Consequently, it is not necessary to use a plurality of scanners, whereby it is possible to miniaturize the distance detecting device. In addition, it is possible to reduce manufacturing cost.

Meanwhile, a distance detecting device according to another embodiment of the present invention or an image processing apparatus including the distance detecting device outputs light based on at least one code signal to the outside, separates the code signal based on light received from the outside, and detects the distance to an external target based on a code signal for a modulation unit and a code signal for a demodulation unit. That is, code signals exhibiting high resistance to external noise are used. Consequently, it is possible to accurately detect the distance to the external target.

In particular, the present invention has an advantage in that it is possible to obtain distance information from a weaker received light than surrounding noise using a method of modulating the code signals. In addition, a plurality of distance detecting devices may use different kinds of code signals. Consequently, it is possible to prevent interference between the respective devices.

Meanwhile, in a case in which a light source unit uses a plurality of output lights, and therefore code signals are added to the respective output lights, the distance detecting device or the image processing apparatus may use a plurality of output lights having different absorption factors. Consequently, it is possible to improve accuracy of the light received from the external target and, in addition, to accurately detect the distance to the external target.

Meanwhile, in a case in which a plurality of code signals is used, the distance detecting device or the image processing apparatus may detect distance information per code signal, and may calculate final distance information based on the detected distance information. Consequently, it is possible to accurately detect the distance to the external target.

Meanwhile, the distance detecting device or the image processing apparatus may output a first light from the light source unit to a first external area, and may output a second light from the light source unit to a second external area, whereby it is possible to improve spatial resolution for distance detection.

Meanwhile, the distance detecting device or the image processing apparatus may horizontally scan the first output light and the second output light from the light source unit with respect to different horizontal lines, whereby it is possible to improve spatial resolution.

Meanwhile, the distance detecting device or the image processing apparatus may use a laser diode as the light source, whereby it is possible to increase the measurable distance and to improve distance resolution.

A distance detecting device according to a further embodiment of the present invention outputs light from a light source unit to the external area by sequential scanning through a scanner, and detects a received light corresponding to the output light through a detection unit. In addition, the distance detecting device uses an absorption member to absorb a backscattered light generated in a polarized beam splitting unit that transmits some of the output light and the received light and reflects some of the output light and the received light. Consequently, it is possible to conveniently detect the distance to the external target while removing the internal backscattered light.

In particular, noise generated by the internal backscattered light is considerably lowered than that generated by the light that is backscattered by the external target and is then received. Consequently, it is possible to increase the measurable distance and to improve distance resolution.

DESCRIPTION OF DRAWINGS

FIGS. 8a and 8b are views exemplarily showing various examples of a scanning method performed by the distance detecting device of FIG. 6.

FIGS. 10a and 10b are views exemplarily showing various examples of a scanning method performed by the distance detecting device of FIG. 9.

FIG. 12 is a view exemplarily showing that the distance detecting device outputs different frequency signals based on the distance.

BEST MODE

Hereinafter, present invention will be described in more detail with reference to the accompanying drawings.

An image processing apparatus described in this specification may be an apparatus in which a distance detecting device can be mounted. The image processing apparatus may include a mobile terminal, a television (TV), a set-top box, a media player, a game console, and a monitoring camera. In addition, the image processing apparatus may include an electric home appliance, such as an air conditioner, a refrigerator, a washing machine, a cooking utensil, or a robot cleaner. Furthermore, the image processing apparatus may include a vehicle, such as a bicycle or a car.

Meanwhile, a mobile terminal may include a mobile phone, a smart phone, a laptop computer (notebook computer), a digital broadcast terminal, a personal digital assistant (PDA), a portable multimedia player (PMP), a digital camera, a navigator, a tablet computer, and an e-book terminal.

The terms "module" and "unit," when attached to the names of components, are used herein to help the understanding of the components and thus they should not be considered as having specific meanings or roles. Accordingly, the terms "module" and "unit" may be used interchangeably.

Figure 1:
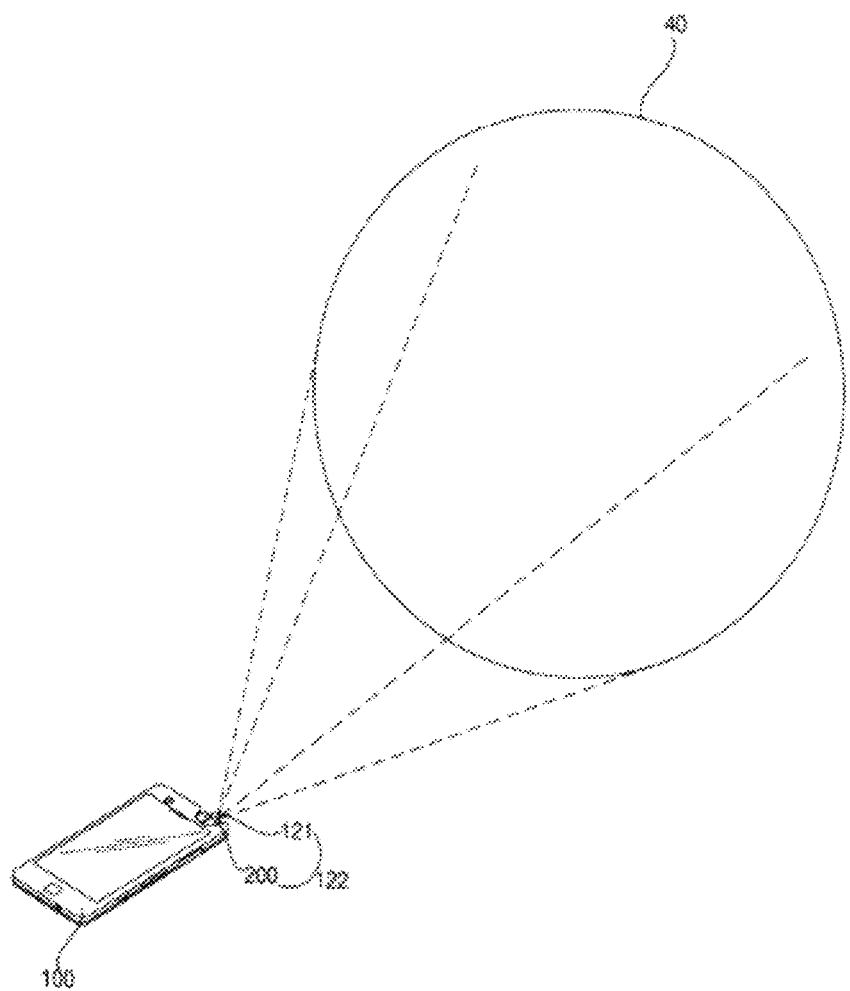
FIG. 1 is a view showing that light for distance detection is projected from an image processing apparatus including a distance detecting device according to an embodiment of the present invention.

FIG. 1 is a view showing that light for distance detection is projected from an image processing apparatus including a distance detecting device according to an embodiment of the present invention.

Referring to the figure, a mobile terminal 100 is shown as an example of the image processing apparatus of FIG. 1. As previously described, a distance detecting device 200 may be mounted in an image processing apparatus, such as a mobile terminal, a TV, a set-top box, a media player, a game console, an electric home appliance, or a vehicle. Hereinafter, a description will be given based on the mobile terminal 100.

The mobile terminal 100 may include a camera 122 to take an image. In addition, the mobile terminal 100 may include a distance detecting device 200 in order to take a three-dimensional (3D) image.

Meanwhile, the camera 122, which acquires an image of an external area 40, and the distance detecting device 200, which acquires information regarding the distance to the external area 40, may be provided in a 3D camera 121. The 3D camera 121 may be a module, in which the camera 122 and the distance detecting device 200 may be included.

Alternatively, the camera 122 and the distance detecting device 200 may be provided in the mobile terminal 100 as separate modules.

Meanwhile, the distance detecting device 200 according to the embodiment of the present invention outputs a light to the external area 40 using at least one light source, receives a plurality of lights backscattered or reflected by the external area 40, and detects the distance to the external area using the difference between the output light and the received lights.

In particular, the distance detecting device 200 according to the embodiment of the present invention outputs a light based on a plurality of transmission signals having different frequencies, converts a light received from the outside, which corresponds to the output light, into a reception signal to calculate the distance to an external target. Consequently, it is possible to accurately measure the distance to the external target.

In particular, a frequency ratio between first and second transmission signals, selected from among the transmission signals, is set not to be an integer multiple such that, when the light is output, it is possible to maintain distance resolution while increasing a measurable distance to the external target. Consequently, the performance of the distance detecting device may be improved, which will hereinafter be described in detail.

Meanwhile, a two-dimensional (2D) scanner that is capable of sequentially performing first directional scanning and second directional scanning may be used to output the light to the outside. Consequently, it is not necessary to use a plurality of scanners, whereby it is possible to miniaturize the distance detecting device 200. In addition, it is possible to reduce manufacturing cost. Meanwhile, a scanner and other components will hereinafter be described with reference to FIG. 2a.

Figure 2A:
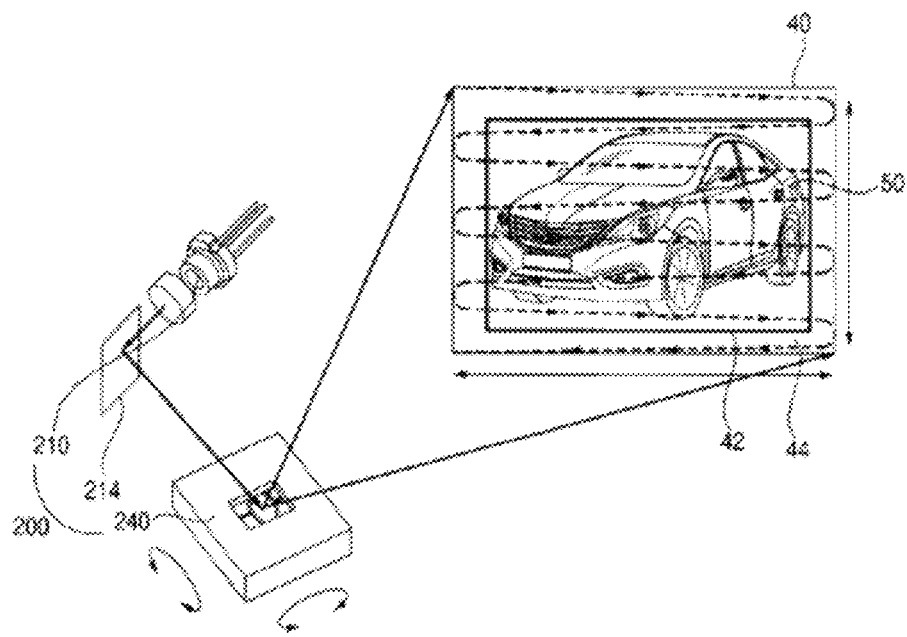
FIG. 2a is a view exemplarily showing a scanning method performed by the distance detecting device of FIG. 1 when light is projected.

FIG. 2a is a view exemplarily showing a scanning method performed by the distance detecting device of FIG. 1 when light is projected.

Referring to the figure, the distance detecting device 200 may include a light source unit 210, a light reflection unit 214, and a scanner 240.

Meanwhile, light output from the distance detecting device 200 may have one wavelength, which corresponds to that of an output light from a single light source. Alternatively, lights having various wavelengths may be used. Hereinafter, a description will be given based on the use of the single light source.

The light source unit 210 may output a light having a predetermined wavelength as an output light. The output light may be light having an infrared wavelength. However, the present invention is not limited thereto. The output light may be light having a visible wavelength, and various other examples may be possible. Hereinafter, a description will be given based on light having an infrared wavelength.

Meanwhile, the light source unit 210 may output a plurality of lights having different wavelengths.

Meanwhile, when light from the light source unit 210 is projected to the external target, it is important to collimate the light. To this end, a laser diode may be used. However, the present invention is not limited thereto. Various examples may be possible.

The output light from the light source unit 210 may be reflected by the light reflection unit 214, and may be incident upon the scanner 240.

Meanwhile, the scanner 240 may receive the output light from the light source unit 210, and may sequentially and repeatedly perform first directional scanning and second direction scanning to the outside.

As shown in the figure, the scanner 240 may perform horizontal scanning from left to right, vertical scanning from top to bottom, horizontal scanning from right to left, and vertical scanning from top to bottom with respect to the external area 40 within an area that can be scanned. This scanning operation may be repeatedly performed over the entirety of the external area 40.

Meanwhile, the light output to the external area 40 may be backscattered or reflected by the external area 40, and may be incident upon the distance detecting device 200. For example, the scanner 240 may receive a light corresponding to the light output to the outside.

The distance detecting device 200 may compare the received light with the output light and detect the distance based on the difference between the received light and the output light. Various distance detection methods may be used. In this embodiment of the present invention, a method using a phase difference is used. The method using the phase difference will hereinafter be described with reference to FIG. 3.

Figure 2B:
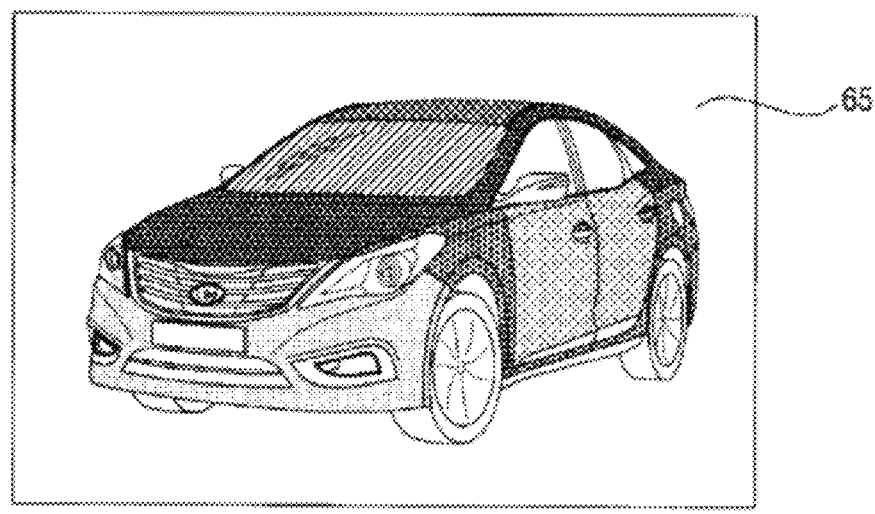
FIG. 2b is a view exemplarily showing distance information that can be obtained by the distance detecting device of FIG. 1.

Meanwhile, distance information calculated by the distance detecting device 200 may be expressed as a brightness image 65 as shown in FIG. 2*b*. Various distance values to the external target may be indicated as corresponding luminance levels. In case of a short distance, a luminance level may be high (bright). In case of a long depth, a luminance level may be low (dark).

Meanwhile, the distance detecting device 200 according to the embodiment of the present invention outputs a light using a plurality of transmission signals having different frequencies. Subsequently, the distance detecting device 200 receives a light corresponding to the output light and converts the received light into a plurality of reception signals. Subsequently, the distance detecting device 200 measures the distance to the external target based on the transmission signals and the reception signals.

Meanwhile, the external area 40 may be divided into a first area 42 and a second area 44 as shown in FIG. 2*a*. The first area 42 may be an area that includes an external target 50, i.e. an active area 42, and the second area 44 may be an area that does not include the external target 50, i.e. a blank area 44.

Consequently, an entire scanning section may be divided into a first scanning section corresponding to the area that includes the external target, i.e. the active area 42, and a second scanning section corresponding to the area that does not include the external target, i.e. the blank area 44.

Figure 3:
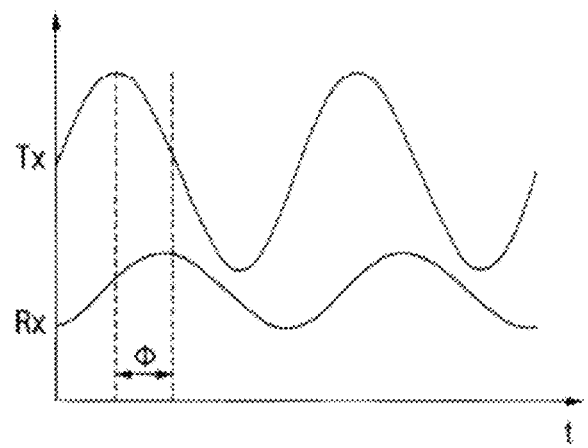
FIG. 3 is a reference view illustrating a distance detecting method performed by the distance detecting device of FIG. 1.

FIG. 3 is a view exemplarily showing a distance detecting method using a phase difference method according to an embodiment of the present invention. In this figure, Tx indicates a phase signal of an output light, and Rx indicates a phase signal of a received light.

Referring to the figure, a processor 270 (see FIG. 4) of the distance detecting device may calculate a distance information level based on a phase difference $\Phi$ between a phase signal of an output light and a phase signal of a received light.

For example, when the phase difference is large, which means that the external area 40 is distant, the distance information level may be set to high. On the other hand, when the phase difference is small, which means that the external area 40 is near, the distance information level may be set to low.

As previously described, the external area 40 may be horizontally and vertically scanned to set the distance information level per area of the external area 40. Meanwhile, the distance information level may be detected per area of the external area 40.

Meanwhile, the processor 270 (see FIG. 4) of the distance detecting device may calculate a distance information level based on a phase difference between an electric signal of an output light and an electric signal of a received light.

Figure 4:
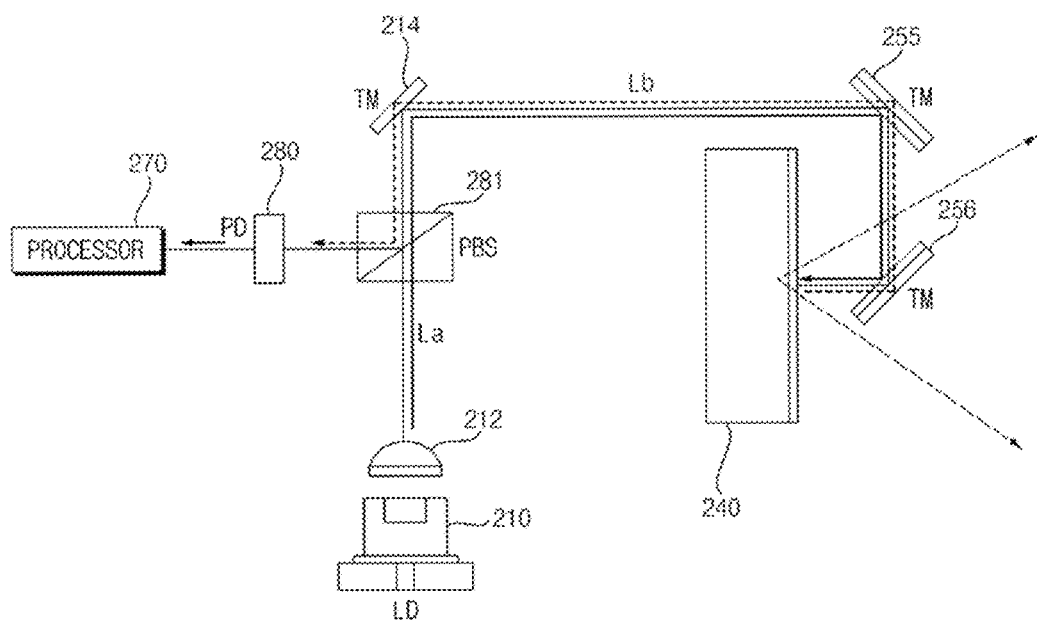
FIG. 4 is a view showing an example of the internal structure of the distance detecting device of FIG. 1.

FIG. 4 is a view showing an example of the internal structure of the distance detecting device of FIG. 1.

Referring to the figure, the distance detecting device 200 may include a light source unit 210, a condensing unit 212, a first light reflection unit 214, a scanner 240, a second light reflection unit 255, a third light reflection unit 256, a detection unit 280, a polarized beam splitting unit 281, and a processor 270.

The condensing unit 212 collimates a light La output from the light source 210. To this end, the condensing unit 212 may include a collimate lens to collimate the output light. At this time, the output light may be a light having two transmission signals La and Lb added thereto, i.e. a modulated light.

Subsequently, the output light La, having passed through the condensing unit 212, passes through the polarized beam splitting unit 281.

The polarized beam splitting unit 281 transmits a polarized component of the output light La and reflects another polarized component of the output light La. For example, the first polarized beam splitting unit 281 transmits a P polarized component of the output light such that the P polarized component of the output light is directed to the scanner 240. On the other hand, the first polarized beam splitting unit 281 reflects an S polarized component of the received light such that the S polarized component of the received light is directed to the detection unit 280. This polarized beam splitting unit may be called a polarizer beam splitter (PBS).

The first light reflection unit 214 reflects the output light La having passed through the polarized beam splitting unit 281 to the scanner 240, and reflects the light received through the scanner 240 to the first polarized beam splitting unit 281. The first light reflection unit 214 may reflect light having different wavelengths in addition to the wavelength of the output light. To this end, the first light reflection unit 214 may include a total mirror (TM).

Meanwhile, although not shown, a polarized beam conversion unit (not shown) may be provided between the first light reflection unit 214 and the second light reflection unit 255.

The polarized beam conversion unit (not shown) may convert a polarization direction of the output light, and may convert a polarization direction of the received light.

For example, the polarized beam conversion unit (not shown) may provide a phase difference to control the polarization direction. In particular, the polarized beam conversion unit may convert a linearly polarized beam into a circularly polarized beam, or may convert a circularly polarized beam into a linearly polarized beam.

Specifically, the polarized beam conversion unit (not shown) converts a P polarized beam of the output light into a circularly polarized beam of the output light. Consequently, the scanner 240 may output the circularly polarized beam of the output light to the outside, and may receive a light Lb having the circularly polarized beam from the outside. On the other hand, the polarized beam conversion unit (not shown) may convert a circularly polarized beam of the light received through the scanner 240 into an S polarized beam. For this reason, the polarized beam conversion unit (not shown) may be called a quarter wavelength plate (QWP).

In another example, the polarized beam conversion unit (not shown) may output the P polarized beam of the output light without conversion, and may convert a P polarized beam of the light received from the scanner 240 into an S polarized beam.

The second light reflection unit 255 reflects the output light La from the first light reflection unit 214 to the scanner 240, and reflects the light Lb received through the scanner 240 to the first light reflection unit 214. The second light reflection unit 255 may reflect light having different wavelengths in addition to the wavelength of the output light. To this end, the second light reflection unit 255 may include a total mirror (TM).

The third light reflection unit 256 reflects the output light having passed through the second light reflection unit 255 to the scanner 240, and reflects the light received through the scanner 240 to the second light reflection unit 255. The third light reflection unit 256 may reflect light of different wavelengths in addition to the wavelength of the output light. To this end, the third light reflection unit 256 may include a total mirror (TM).

Meanwhile, in the distance detecting device of FIG. 4, an optical path of the output light La and an optical path of the received light Lb partially overlap. A distance detecting device configured to have a structure in which an optical path of an output light and an optical path of a received light partially overlap may be called a coaxial optical system. The distance detecting device having the above structure may have a compact size, may be resistant to external light, and may exhibit a high signal to noise ratio.

On the other hand, an optical path of the output light and an optical path of the received light may be completely separated from each other. A distance detecting device configured to have a structure in which an optical path of output light and an optical path of received light are completely separated from each other may be called a separated optical system.

Meanwhile, the scanner 240 may receive the output light from the light source 210, and may sequentially and repeatedly perform first direction scanning and second direction scanning with respect to the outside. This scanning operation is repeatedly performed over the entirety of the external area 40.

During scanning of the scanner 240, the detection unit 280 converts the output light from the light source 210 into a first electric signal in the first scanning section of the external area 40 corresponding to the first area 44, and converts the light received from the outside, which corresponds to the output light, into a second electric signal in the second scanning section of the external area 40 corresponding to the second area 42.

To this end, the detection unit 280 may include a photodiode to convert an optical signal into a reception signal, i.e. an electric signal. In particular, the detection unit 280 may include a photodiode exhibiting a high photoelectric efficiency, such as an Avalanche photodiode to convert a weak light that is backscattered by the external target 240 and is then received into an electric signal.

Meanwhile, although not shown, a sampler (not shown) to convert an analog signal into a digital signal may be further provided between the detection unit 280 and the processor 270.

The sampler (not shown) may sample a first or second reception signal from the detection unit 280, and may output the sampled first or second reception signal.

The processor 270 detects a first distance to the external target 50 using a phase difference between a first transmission signal having a first frequency and a first reception signal having a first frequency. In addition, the processor 270 detects a second distance to the external target 50 using a phase difference between a second transmission signal having a second frequency and a second reception signal having a second frequency. Finally, the processor 270 may calculate a final distance to the external target using the first distance and the second distance.

Meanwhile, the processor 270 may control overall operation of the distance detecting device.

Figure 5:
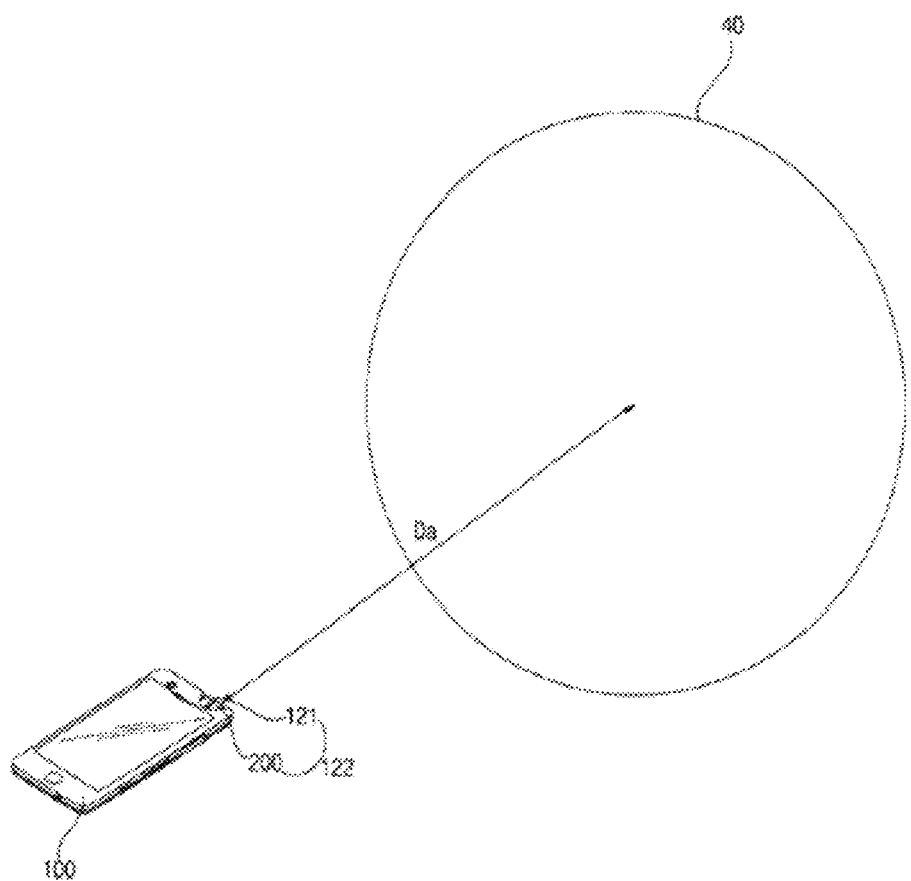
FIG. 5 is a view exemplarily showing the distance between the distance detecting device and an external target.

FIG. 5 is a view exemplarily showing the distance between the distance detecting device and the external target.

Referring to the figure, the distance between the mobile terminal 100 including the distance detecting device 200 and the external target 40 is denoted by Da.

Figure 6:
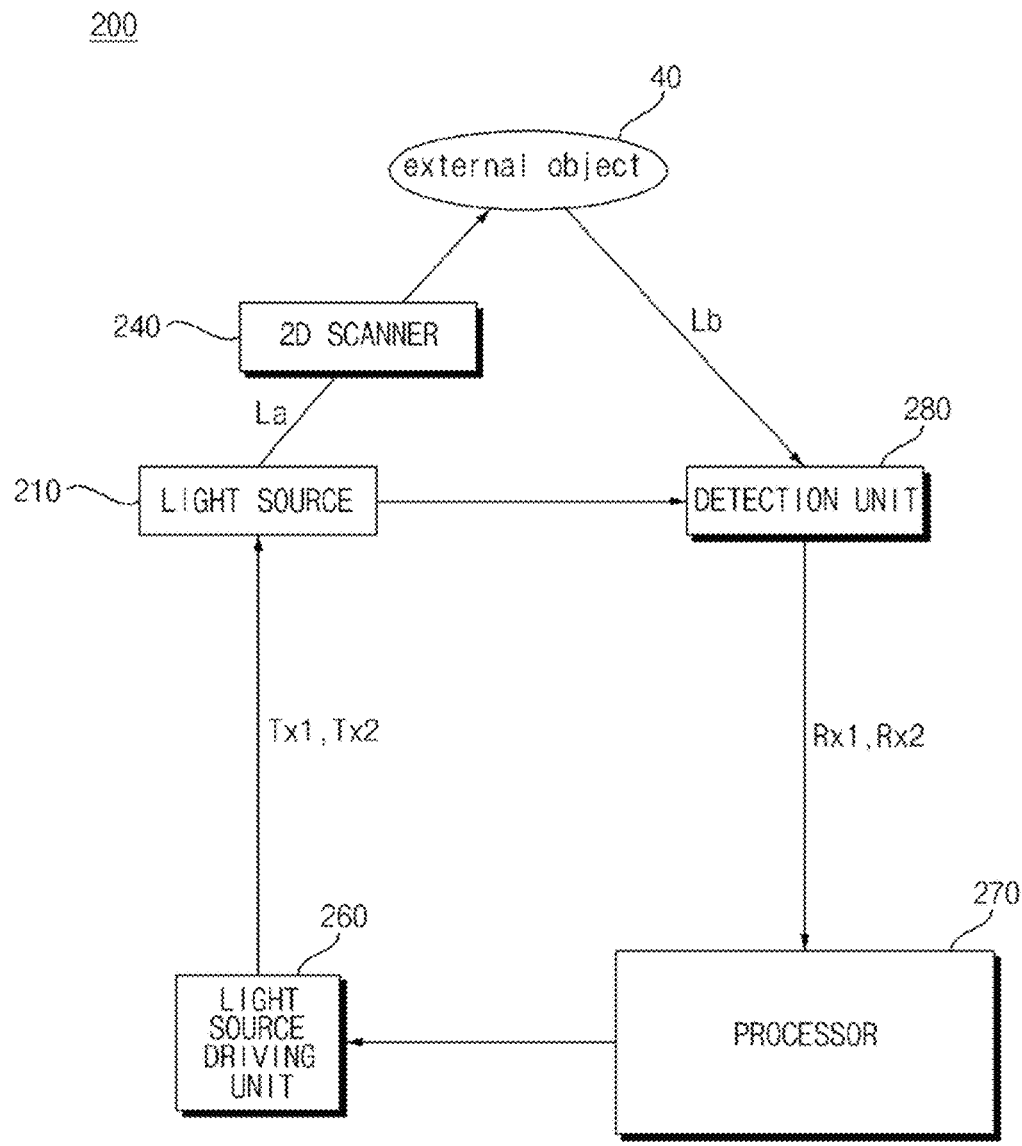
FIG. 6 is an internal block diagram showing an example of the distance detecting device of FIG. 1.

FIG. 6 is an internal block diagram showing an example of the distance detecting device of FIG. 1.

Referring to the figure, the distance detecting device 200 of FIG. 6 includes a light source unit 210, a light source driving unit 260, a 2D scanner 240, a detection unit 280, and a processor 270.

The light source driving unit 260 outputs a plurality of sinusoidal driving signals to the light source unit 210. The sinusoidal driving signals are transmission signals having different frequencies. In the figure, sinusoidal driving signals are denoted by Tx1 and Tx2.

The light source unit 210 outputs a light La having a single wavelength based on the sinusoidal driving signals having different frequencies, i.e. the transmission signals.

Meanwhile, the processor 270 may control the light source driving unit 260 to output transmission signals having different frequencies.

The 2D scanner 240 may output a light La having a single wavelength to the external target 40 while sequentially performing horizontal scanning and vertical scanning.

The light La output to the external target 40 is backscattered or reflected by the external target 40. As a result, a light Lb backscattered or reflected by the external target 40 may be received by the distance detecting device 200.

The detection unit 280 receives the light Lb, and converts the received light into a reception signal, i.e. an electric signal. Meanwhile, the transmission signals Tx1 and Tx2 having different frequencies are added to the output light La. Consequently, the detection unit 280 may separate reception signals Rx1 and Rx2 having different frequencies from the received light.

The separated reception signals Rx1 and Rx2 are transmitted to the processor 270. The processor 270 may calculate a first distance to the external target based on the first transmission signal Tx1, selected from among the transmission signals, and the first reception signal Rx1 corresponding to the first transmission signal Tx1, calculate a second distance to the external target based on the second transmission signal Tx2, selected from among the transmission signals, and the second reception signal Rx2 corresponding to the second transmission signal Tx2, and calculate a final distance to the external target based on the calculated first and second distances.

Meanwhile, the distance detecting device 200 according to the embodiment of the present invention uses a phase difference method. That is, the distance detecting device may calculate the distance to the external target based on a phase difference between the transmission signal related to the output light and the reception signal related to the received light.

In this case, it is not possible to determine whether the phase difference between the transmission signal and the reception signal has exceeded one cycle of a sinusoidal wave or has not exceeded one cycle of a sinusoidal wave. As a result, it is not possible to correctly obtain the distance to the external target 40.

When the distance is calculated using the phase difference method, therefore, the maximum distance that can be measured is decided based on the frequency of the transmission signal.

Meanwhile, in order to increase the measurable distance, it is necessary to lower the frequency of the transmission signal. In this case, the measurable maximum distance is increased, whereas resolution is lowered.

The embodiment of the present invention proposes a method of increasing the measurable maximum distance while maximally maintaining the frequency of the transmission signal in consideration of the measurable maximum distance and the resolution.

Specifically, the distance detecting device 200 according to the embodiment of the present invention adds a plurality of transmission signals when outputting an output light. The transmission signals may be different from each other in terms of at least one selected from among a wavelength, a frequency, emission timing, and an emission space.

FIGS. 7a to 7f are graphs showing a process of calculating distances using two transmission signals and calculating a final distance using a relationship between the two distances.

Figure 7A:
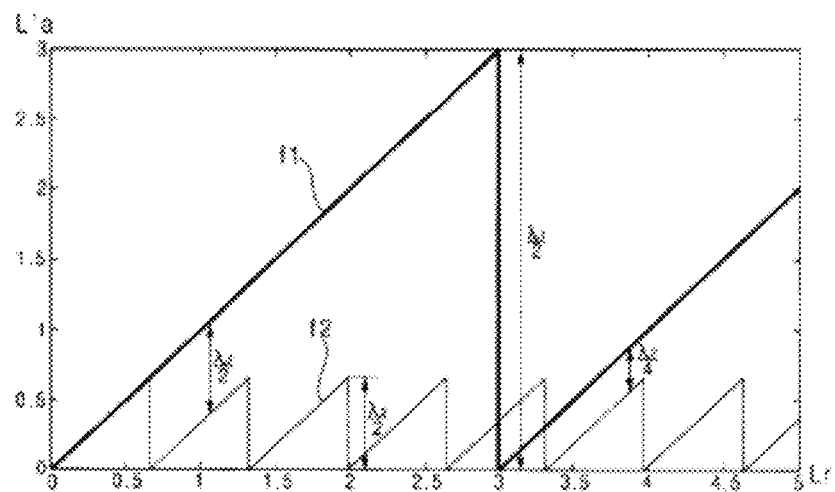
FIGS. 7a to 7f are views illustrating an example of a distance detecting method performed by the distance detecting device of FIG. 6.

First, FIG. 7a is a graph exemplarily showing that distances are detected using a first transmission signal and a second transmission signal.

In FIG. 7a, the horizontal axis indicates a real distance Lr, and the vertical axis indicates a calculated distance L'a calculated by the processor 270 based on two transmission and reception signals. In the figure, the first transmission signal is shown as having a frequency of 50 MHz, and the second transmission signal is shown as having a frequency of 225 MHz.

Meanwhile, it is possible to calculate the detectable maximum distance based on the first transmission signal from Equation 1 below.

$$D_1 = \frac{C}{2f_1} \qquad \text{Equation 1}$$

D1 indicates the measurable maximum distance of the first transmission signal, C indicates velocity of light, i.e. 3×108 m/s, and f1 indicates a frequency of the first transmission signal. In a case in which the frequency of the first transmission signal is 50 MHz, the measurable maximum distance D1 may be 3 m.

Meanwhile, it is possible to calculate the detectable maximum distance based on the second transmission signal from Equation 2 below.

$$D_2 = \frac{C}{2f_2} \qquad \text{Equation 2}$$

D2 indicates the measurable maximum distance of the second transmission signal, C indicates velocity of light, i.e. 3×108 m/s, and f2 indicates a frequency of the second transmission signal. In a case in which the frequency of the second transmission signal is 225 MHz, the measurable maximum distance D2 may be 0.67 m.

Meanwhile, it can be seen that the measurable maximum distance decreases as the frequency increases.

Referring to FIG. 7a, it can be seen that, for the first transmission signal having the first frequency f1, the real distance and the calculated distance coincide with each other within 3 m, whereas the real distance and the calculated distance are different from each other after 3 m. In addition, it can be seen that, for the second transmission signal having the second frequency f2, the real distance and the calculated distance coincide with each other within 0.67 m, whereas the real distance and the calculated distance are different from each other after 0.67 m.

Figure 7B:
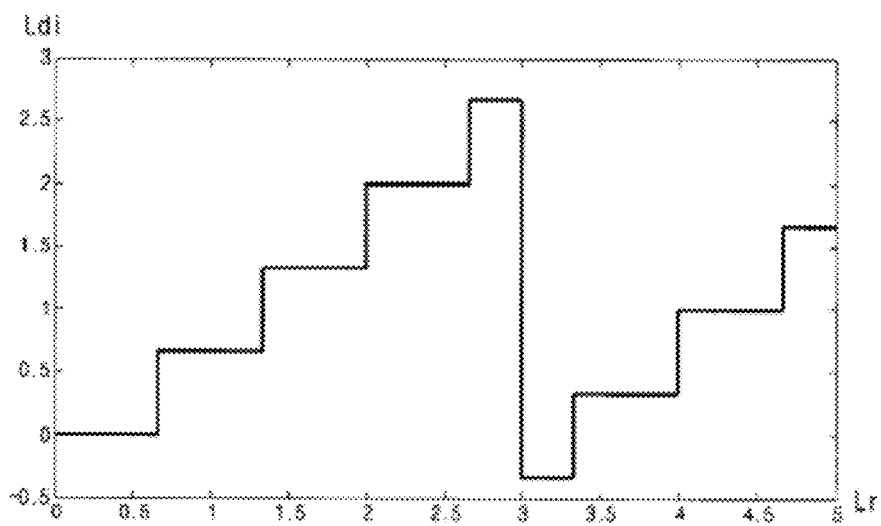

A difference between a distance graph corresponding to the first frequency f1 and a distance graph corresponding to the second frequency f2 of FIG. 7a may be calculated to obtain a distance difference graph as shown in FIG. 7b.

In FIG. 7b, the horizontal axis indicates a real distance Lr, and the vertical axis indicates a calculated distance difference Ldi based on two frequencies.

Figure 7C:
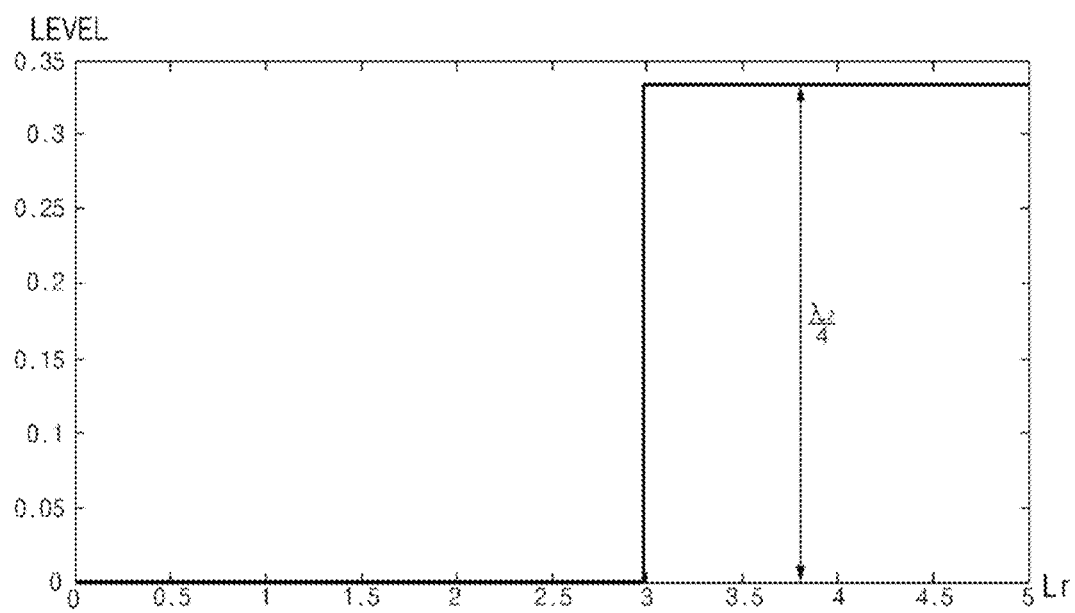

Next, FIG. 7c shows a residual obtained by dividing the graph of FIG. 7b by λ2/2, which is related to a wavelength of the second transmission signal.

Referring to FIG. 7c, it can be seen that a result of the distance greater than the measurable maximum distance, 3 m, of the first transmission signal is λ2/4.

Figure 7D:
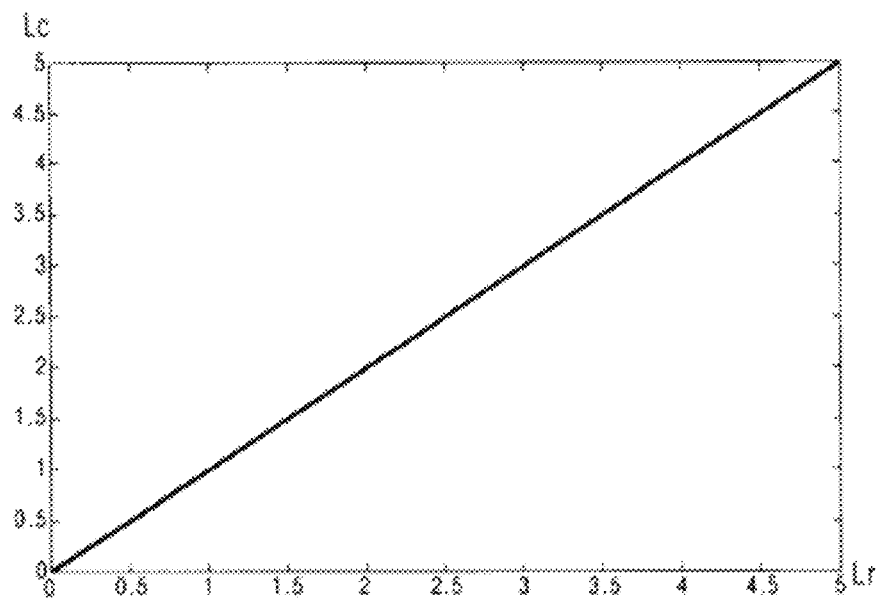

Meanwhile, FIG. 7d shows that the distance calculated through the first transmission signal is corrected based on the result of FIG. 7c.

Referring to FIG. 7b, since a graph pattern after 3 m does not coincide with graph pattern after 0 m, the distance after 3 m may be distinguished. Consequently, it is possible to increase the measurable distance using the same. As a result, it is possible to obtain a graph as shown in FIG. 7. In FIG. 7d, the horizontal axis indicates a real distance Lr, and the vertical axis indicates a calculated distance Lc that has been corrected.

In order to increase the maximum distance that can be calculated using the two transmission signals having different frequencies as described above, it is preferable for a frequency ratio between first and second transmission signals Tx2 not to be an integer multiple. In particular, the frequency ratio between first and second transmission signals Tx2 may be n+0.5. In FIG. 7a, the frequency of the first transmission signal is shown as being 50 MHz, and the frequency of the second transmission signal is shown as being 225 MHz. Consequently, it can be seen that the frequency ratio is 4.5.

Figure 7E:
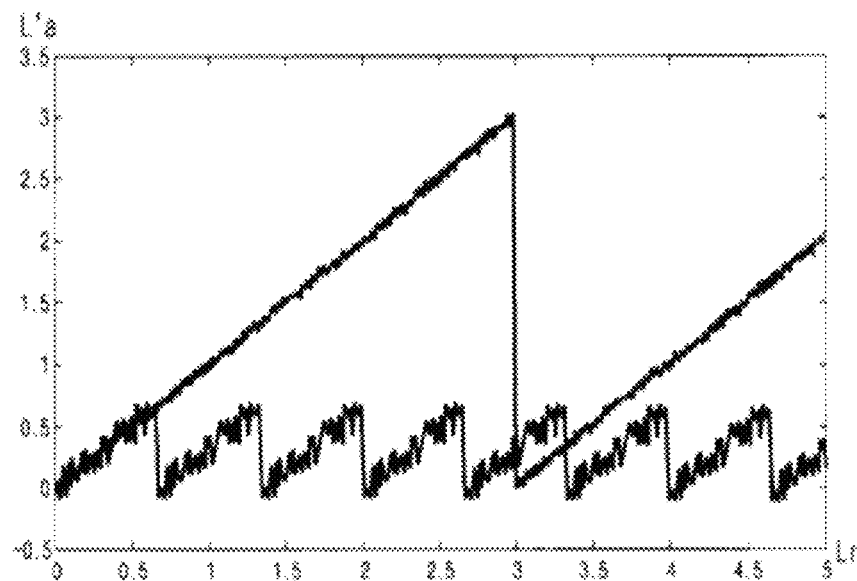

Meanwhile, FIG. 7e is a view exemplarily showing a case in which a calculated distance includes an error as compared with a real distance. The graph of FIG. 7e is similar to that of FIG. 7a except that the calculated distance includes an error.

Figure 7F:
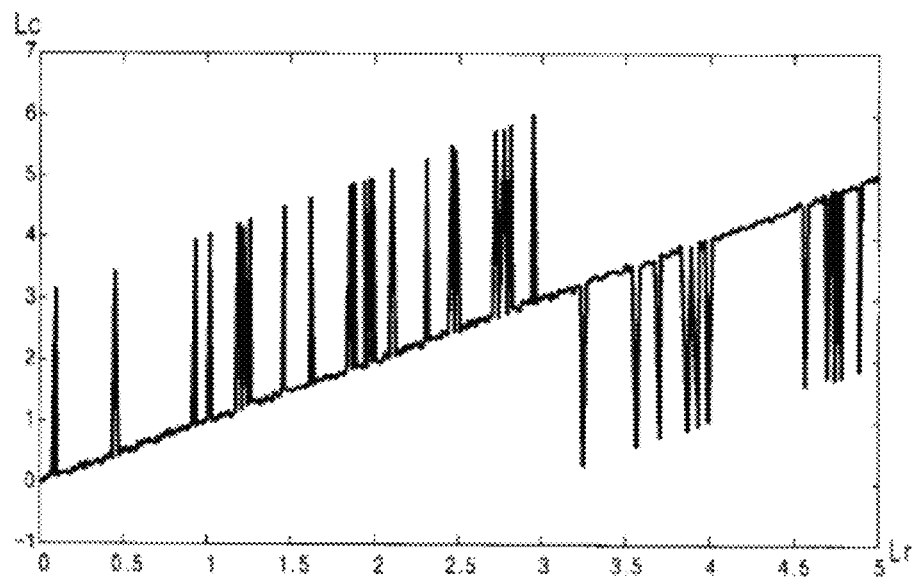

In a case in which the calculated distance includes an error as described above, a large distortion is generated as shown in FIG. 7f. Consequently, tolerance for the distance error must be large. When two frequencies have a relationship of 1.5 times, i.e. N=1, the tolerance is the largest. On the other hand, when the two frequencies have a relationship of 2.5 times or 3.5 times, i.e. N increases, the tolerance may gradually decrease.

Meanwhile, when the sum of the errors of the first calculated distance and the second calculated distance is less than λ2/8, the corrected distance Lc has no distortion as shown in FIG. 7d.

Figure 8A:
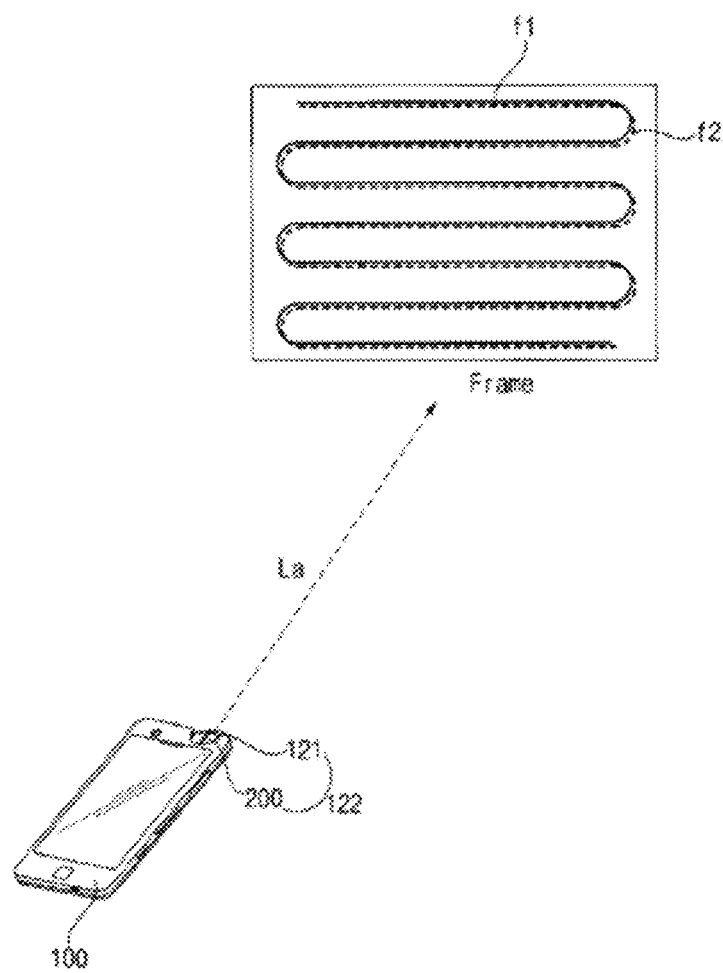

FIGS. 8a and 8b are views exemplarily showing various examples of a scanning method performed by the distance detecting device of FIG. 6.

First, FIG. 8a exemplarily shows that a wavelength of an output light based on the first transmission signal Tx1, selected from among the transmission signals, is identical to a wavelength of an output light based on the second transmission signal Tx2. That is, the figure exemplarily shows that two transmission signals are output in a state of being added to an output light La having a single wavelength.

In addition, FIG. 8a exemplarily shows that, during horizontal scanning and vertical scanning, an output light based on the transmission signal having the first frequency f1 and an output light based on the transmission signal Tx1 having the second frequency f2 are simultaneously output.

Next, FIG. 8b exemplarily shows that an output light La having a single wavelength is output, but transmission signals having different frequencies are added per frame. That is, the figure exemplarily shows that an output light having the transmission signal of the first frequency f1 added thereto is output during a first frame Frame 1, an output light having the transmission signal of the second frequency f2 added thereto is output during a second frame Frame 2, and an output light having the transmission signal of the first frequency f1 added thereto is output again during a third frame Frame 3.

In a case in which the two transmission signals are alternately output in a state of being divided per frame as shown in FIG. 8b, the single frequency signal may occupy almost the most part of transmission signal power, which is desirable in terms of SNR. In addition, one sinusoidal signal may be generated and output without performing an additional modulation process, whereby it is possible to relatively reduce a harmonic component.

Alternatively, the two transmission signals may be alternately output per line unlike in FIG. 8b.

Figure 9:
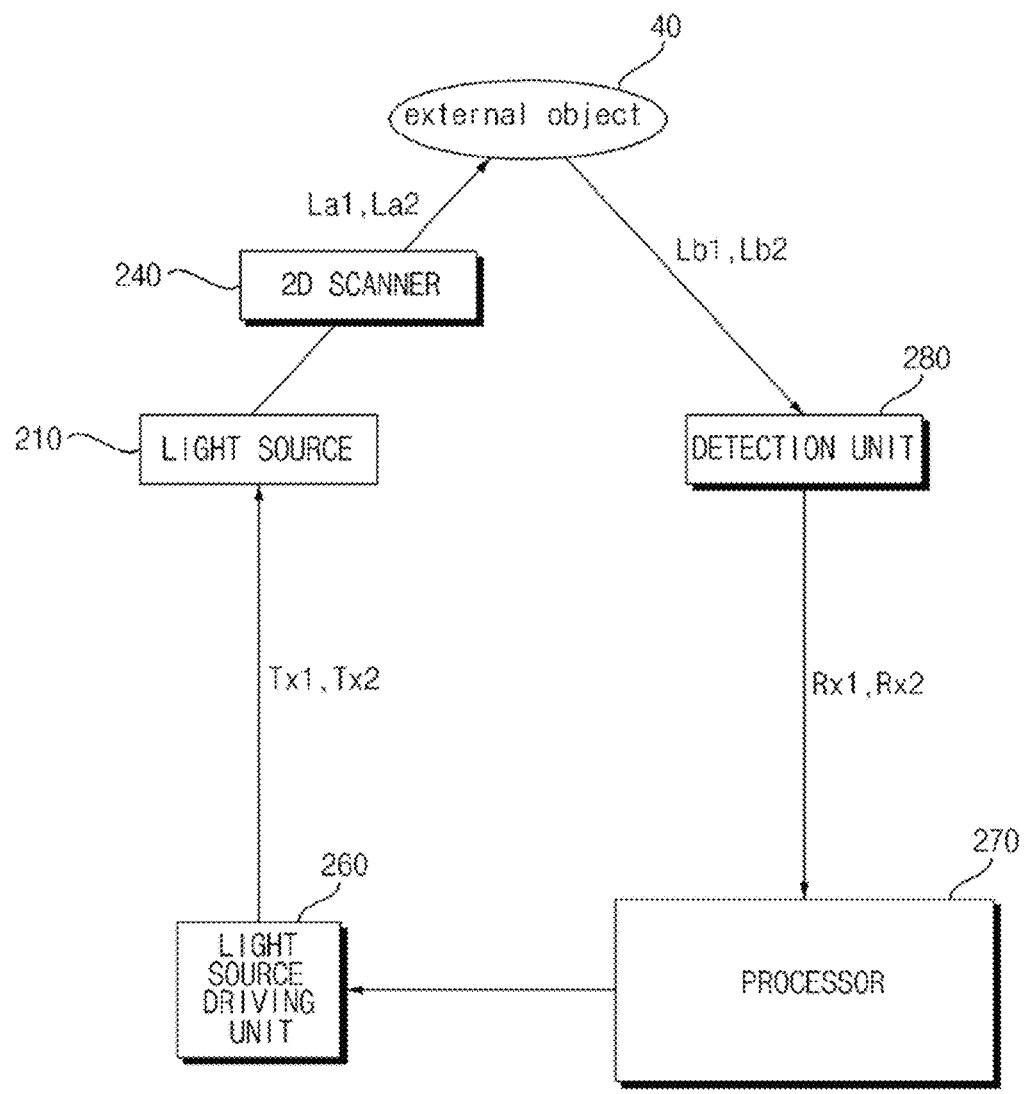
FIG. 9 is an internal block diagram showing another example of the distance detecting device of FIG. 1.

FIG. 9 is an internal block diagram showing another example of the distance detecting device of FIG. 1.

The distance detecting device 200 of FIG. 9 is similar to the distance detecting device 200 of FIG. 6, and therefore the distance detecting device will be described based on the difference therebetween. The distance detecting device 200 of FIG. 9 includes a light source unit 210, a light source driving unit 260, a 2D scanner 240, a detection unit 280, and a processor 270.

The light source unit 210 may output lights La and Lb corresponding to a plurality of sinusoidal driving signals having different frequencies, i.e. transmission signals. That is, the light source unit may output a light La1 having a first wavelength corresponding to a first transmission signal Tx1, and may output a light La2 having a second wavelength corresponding to a second transmission signal Tx2.

Correspondingly, the detection unit 280 may receive a first light Lb1 and a second light Lb2, and may separate reception signals Rx1 and Rx2 having different frequencies from the respective received lights Lb1 and Lb2.

The processor 270 may calculate a first distance to the external target based on the first transmission signal Tx1, selected from among the transmission signals, and the first reception signal Rx1 corresponding to the first transmission signal Tx1, calculate a second distance to the external target based on the second transmission signal Tx2, selected from among the transmission signals, and the second reception signal Rx2 corresponding to the second transmission signal Tx2, and calculate a final distance to the external target based on the calculated first and second distances.

Figure 10B:
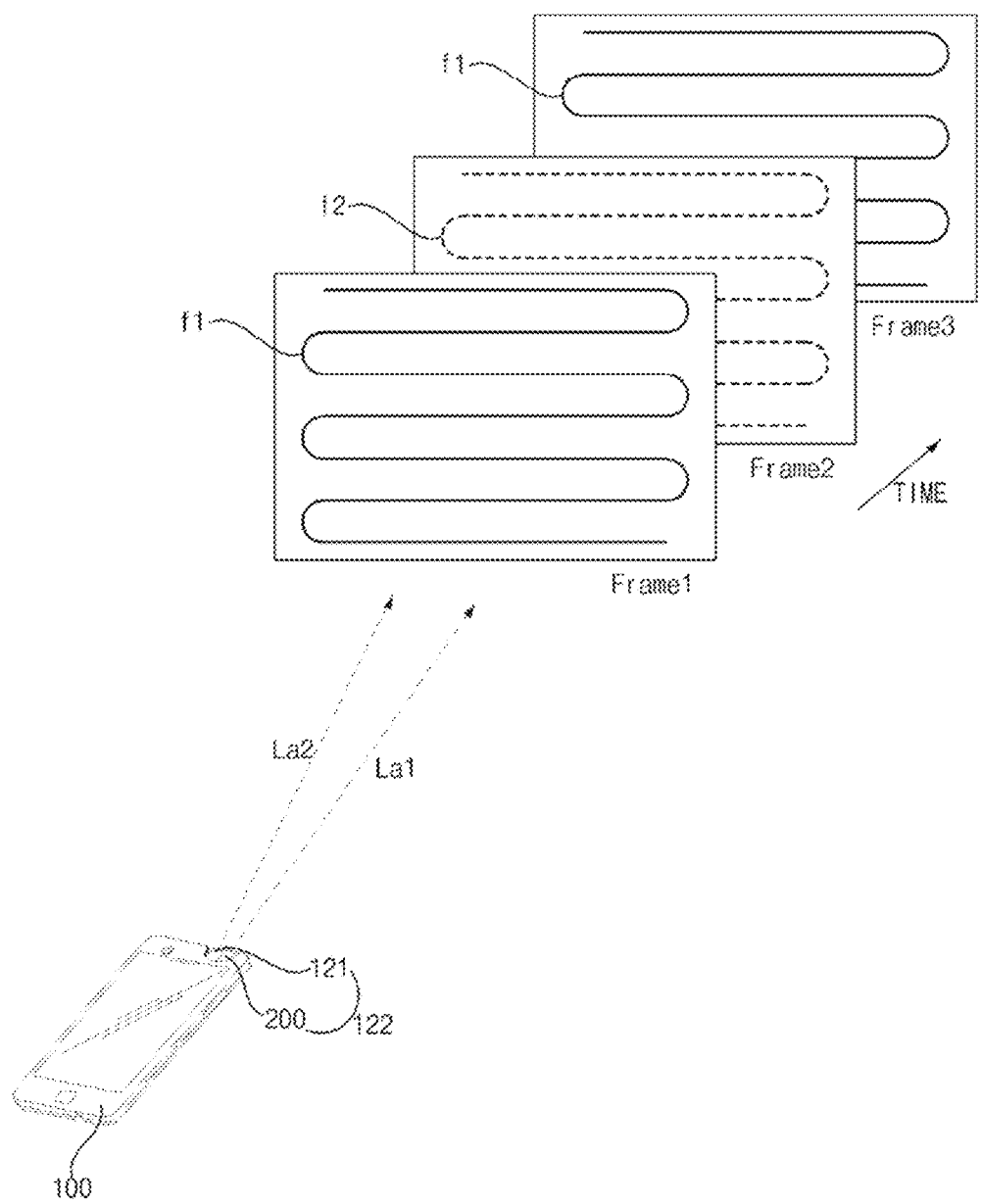

FIGS. 10a and 10b are views exemplarily showing various examples of a scanning method performed by the distance detecting device of FIG. 9.

First, FIG. 10a exemplarily shows that a wavelength of a first output light La1 based on the first transmission signal Tx1, selected from among the transmission signals, is different from a wavelength of a second output light La2 based on the second transmission signal Tx2. That is, the figure exemplarily shows that two transmission signals are output in a state of being added to output lights La1 and LA2 having different wavelengths.

In addition, FIG. 10a exemplarily shows that, during horizontal scanning and vertical scanning, a first output light La1 based on the transmission signal having the first frequency f1 and a second output light La2 based on the transmission signal Tx1 having the second frequency f2 are simultaneously output.

Next, FIG. 10b exemplarily shows that an output light La having a single wavelength is output, but transmission signals having different frequencies are added per frame. That is, the figure exemplarily shows that a first output light La1 having the transmission signal of the first frequency f1 added thereto is output during a first frame Frame 1, a second output light La1 having the transmission signal of the second frequency f2 added thereto is output during a second frame Frame 2, and a first output light La1 having the transmission signal of the first frequency f1 added thereto is output again during a third frame Frame 3.

In a case in which the two output lights are output in a state of being divided per frame as shown in FIG. 10b, the single frequency signal may occupy almost the most part of transmission signal power, which is desirable in terms of SNR. In addition, one sinusoidal signal may be generated and output without performing an additional modulation process, whereby it is possible to relatively reduce a harmonic component.

FIGS. 11a to 11f are views illustrating another example of a distance detecting method performed by the distance detecting device of FIG. 6 or 9.

In FIGS. 7a to 7f, the frequencies of the two transmission signals are shown as being 50 MHz and 225 MHz. Alternatively, various modifications may be possible as shown in FIGS. 11a to 11f. In FIGS. 11a to 11f, usable frequencies of the transmission signals are shown as being 60 MHz, 90 MHz, 120 MHz, and 150 MHz.

In addition, it is also possible for a user to vary a set of transmission signals selected from among a plurality of transmission signals per frame or whenever the distance to the external target is measured.

In order to select transmission signals having various frequencies, the following conditions may be considered.

First, a frequency of less than 30 MHz is necessary in order to measure a distance of 5 m or more using a single frequency.

Meanwhile, in a case in which a measurable distance is increased using two frequencies, the measurable maximum distance corresponds to half a frequency wavelength equivalent to the greatest common measure of the two frequencies. That is, the measurable maximum distance may be decided by Equation 3 below.

$$D_{fin} = \frac{C}{2f_{gcm}} \quad \text{Equation 3}$$

Dfin indicates the measurable maximum distance that can be maximally measured using the first transmission signal having the first frequency f1 and the second transmission signal having the second frequency f2, C indicates velocity of light, i.e. 3×108 m/s, and fcm indicates the greatest common measure frequency of the first frequency f1 and the second frequency f2.

For example, in a case in which the frequency f1 of the first transmission signal is 60 MHz and the frequency f2 of the second transmission signal is 90 MHz, the distance D1 that can be measured by the first frequency f1 is 2.5 m according to Equation 1, the distance D2 that can be measured by the second frequency f2 is 1.67 m according to Equation 2, and the greatest common measure frequency of the first and second frequencies, whereby the final measurable maximum distance Dfin increases to 5 m according to Equation 3.

That is, in order to measure a distance of 5 m or more using two frequencies, it is preferable for the greatest common measure of the two frequencies to be 30 MHz or less.

Meanwhile, in a case in which the measurable distance is increased using two transmission signals having different frequencies, the allowable maximum distance error Errmax may be calculated as represented by Equation 4 below in consideration of an error component.

$$Err_{max} = \frac{\lambda_2 f_{gcm}}{4f_1}, (f_1 < f_2) \quad \text{Equation 4}$$

Where λ2 indicates a wavelength of the second frequency f2, f1 indicates the first frequency f1, and fgcm indicates the greatest common measure frequency of the first frequency f1 and the second frequency f2.

For example, in a case in which the first and second frequencies are 60 MHz and 90 MHz, respectively, D1 and D2 may be 2.5 m and 1.67 m, respectively, the final measurable maximum distance Dfin may be 5 m, and the allowable maximum distance error Errmax may be 0.4147 m.

In another example, in a case in which the first and second frequencies are 50 MHz and 60 MHz, respectively, D1 and D2 may be 3 m and 2.5 m, respectively, the final measurable maximum distance Dfin may be 15 m, and the allowable maximum distance error Errmax may be 0.25 m. When a difference between D1 and D2 is calculated, i.e. D1−D2, in FIG. 7a, a step graph having a plurality of levels may be obtained as shown in FIG. 7b. At this time, in FIG. 7b, a difference between the respective levels is λ2/2 within a distance of λ1/2 on the x axis. That is, a difference between a first level and a second level is λ2/2, and a difference between a second level and a third level is λ2/2. The reason is that, if the difference is λ2/2, D2 is lowered to 0. When D1−D2 is performed and residual calculation is performed for λ2/2, therefore, the residual valve is uniform within a distance of λ1/2 on the x axis as shown in FIG. 7c.

When the measurable distance is increased using the two frequencies, it is necessary to know which section of D1 the real distance belongs to. To this end, FIG. 7c is used. This graph is obtained through the residual calculation as described above and thus has a value of 0 to λ2/2.

Meanwhile, the maximum distance that can be obtained using the two frequencies f1 and f2 is decided based on the greatest common measure frequency fgcm. For example, in a case in which f1 and f2 are 50 MHz and 225 MHz, respectively, the greatest common measure frequency fgcm is 25 MHz. Consequently, the measurable maximum distance may be decided to half the wavelength of 25 MHz, i.e. 6 m. Hereinafter, half the wavelength will be described as one cycle.

Figure 11A:
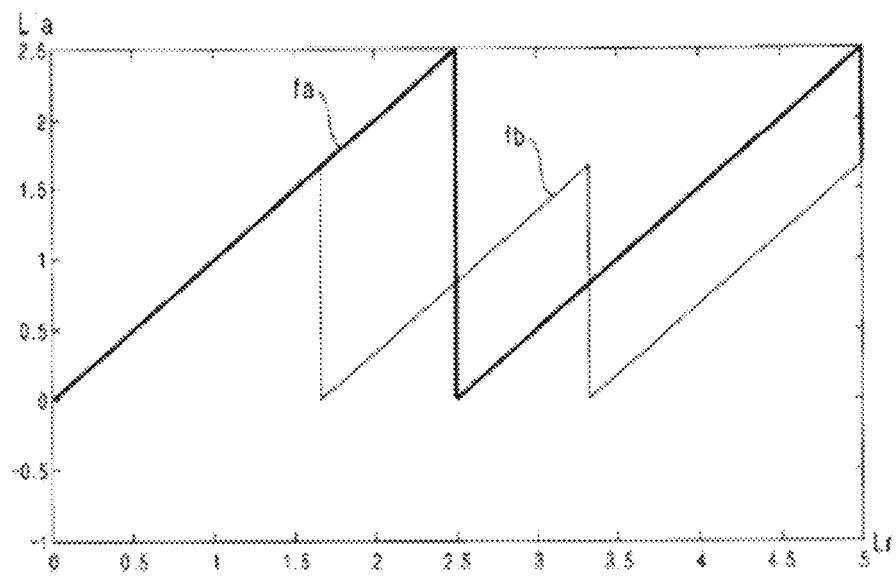
FIGS. 11a to 11f are views illustrating another example of a distance detecting method performed by the distance detecting device of FIG. 6 or 9.

In a case in which a transmission frequency of 50 MHz is used within 6 m, two cycles may be based on a received signal. Whether the measured distance is the first cycle or the second cycle may be confirmed through FIG. 7c. However, FIG. 7c has a value of 0 to λ2/2. For division into two sections, therefore, 0 to λ2/2 may be divided into 0 to λ2/4 and λ2/4 to λ2/2, which is related to the maximum distance error. The number of sections may be decided by fgcm/f1. Consequently, the maximum distance error may be calculated as represented by Equation 4. FIG. 11a exemplarily shows a distance calculation graph using a first transmission signal and a second transmission signal. A frequency fa of the first transmission signal may be 60 MHz, and a frequency fb of the second transmission signal may be 90 MHz.

In FIG. 11a, the horizontal axis indicates a real distance Lr, and the vertical axis indicates a calculated distance L'a calculated by the processor 270 based on two transmission and reception signals.

Figure 11B:
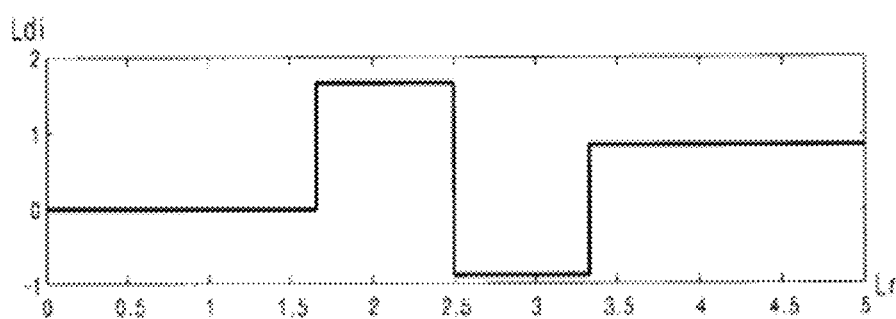

A difference between a distance graph corresponding to the first frequency fa and a distance graph corresponding to the second frequency fb of FIG. 11a may be calculated to obtain a distance difference graph as shown in FIG. 11b.

In FIG. 11b, the horizontal axis indicates a real distance Lr, and the vertical axis indicates a calculated distance difference Ldi based on two frequencies. Since levels of the calculated distance difference Ldi based on the two frequencies are different from each other, it is possible to measure the distance up to a real distance of 5 m. At this time, the allowable maximum distance error may be 0.4147 m.

Figure 11C:
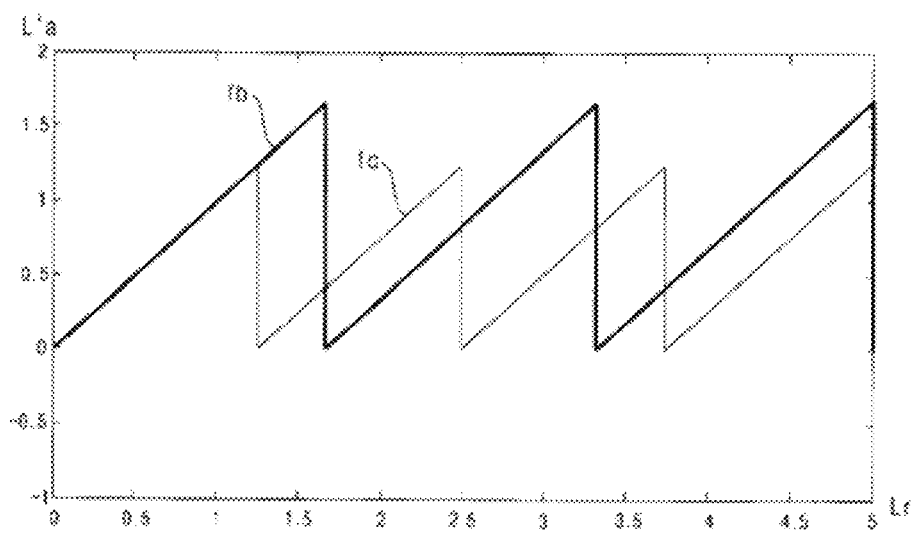

Next, FIG. 11c exemplarily shows a distance calculation graph using a second transmission signal and a third transmission signal. A frequency fb of the second transmission signal may be 90 MHz, and a frequency fc of the third transmission signal may be 120 MHz.

In FIG. 11c, the horizontal axis indicates a real distance Lr, and the vertical axis indicates a calculated distance L'a calculated by the processor 270 based on two transmission and reception signals.

Figure 11D:
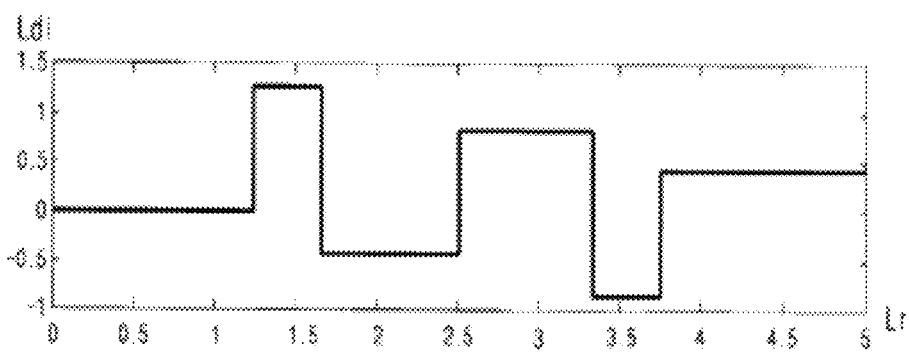

A difference between a distance graph corresponding to the second frequency fb and a distance graph corresponding to the third frequency fc of FIG. 11c may be calculated to obtain a distance difference graph as shown in FIG. 11d.

In FIG. 11d, the horizontal axis indicates a real distance Lr, and the vertical axis indicates a calculated distance difference Ldi based on two frequencies. Since levels of the calculated distance difference Ldi based on the two frequencies are different from each other, it is possible to measure the distance up to a real distance of 5 m. At this time, the allowable maximum distance error may be 0.2083 m.

Figure 11E:
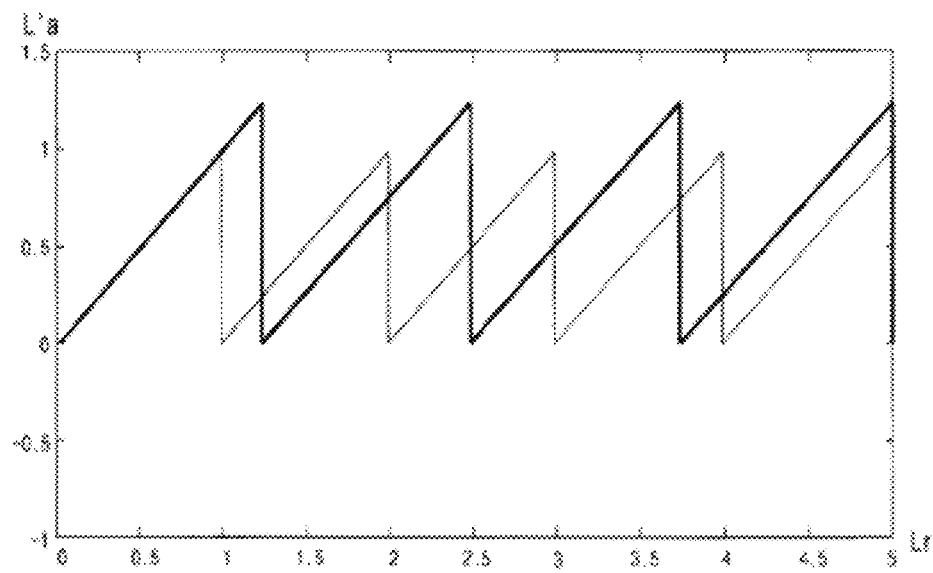

Next, FIG. 11e exemplarily shows a distance calculation graph using a third transmission signal and a fourth transmission signal. A frequency fc of the third transmission signal may be 120 MHz, and a frequency fd of the fourth transmission signal may be 150 MHz.

In FIG. 11e, the horizontal axis indicates a real distance Lr, and the vertical axis indicates a calculated distance L'a calculated by the processor 270 based on two transmission and reception signals.

Figure 11F:
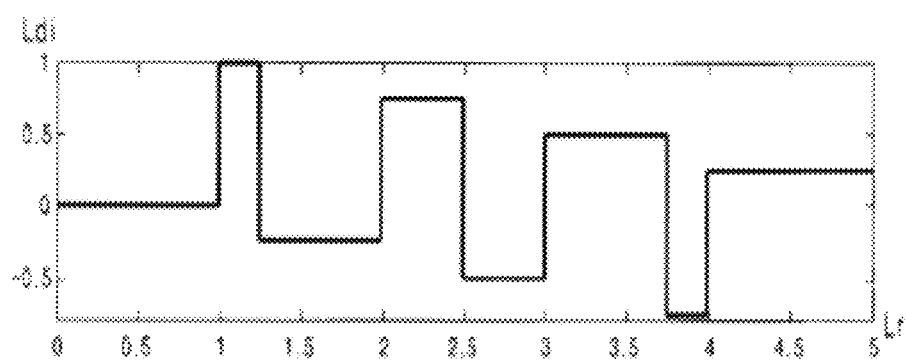

A difference between a distance graph corresponding to the third frequency fc and a distance graph corresponding to the fourth frequency fd of FIG. 11e may be calculated to obtain a distance difference graph as shown in FIG. 11f.

In FIG. 11f, the horizontal axis indicates a real distance Lr, and the vertical axis indicates a calculated distance difference Ldi based on two frequencies. Since levels of the calculated distance difference Ldi based on the two frequencies are different from each other, it is possible to measure the distance up to a real distance of 5 m. At this time, the allowable maximum distance error may be 0.125 m.

FIGS. 11a to 11f exemplarily show that the greatest common measure of the two frequencies is set to less than 30 MHz. Meanwhile, the allowable maximum distance error decreases as the two frequencies increase.

The distance detecting device 200 of FIG. 6 or 9 according to the embodiment of the present invention may use the method described with reference to FIGS. 11a to 11 f.

As described with reference to FIGS. 11a to 11f, in a case in which the greatest common measure of two frequencies is 30 MHz, the measurable distance may be 5 m. In a case in which the greatest common measure of two frequencies is 50 MHz, the measurable distance may be 3 m. In a case in which the greatest common measure of two frequencies is 60 MHz, the measurable distance may be 2.5 m.

It is possible to vary the measurable distance by varying the greatest common measure of two frequencies as described above. Even when the two frequencies have the same greatest common measure, it is possible to vary the respective frequencies as shown in FIGS. 11a to 11f.

Hereinafter, a method of varying a frequency of an output light will be described.

FIG. 12 is a view exemplarily showing that the distance detecting device outputs different frequency signals based on the distance.

FIG. 12(a) exemplarily shows that the mobile terminal 100 including the distance detecting device 200 outputs lights based on first and second frequencies ft1 and ft2 to an external target 40a spaced apart therefrom by a first distance Dta at a first time Ta. For example, the first and second frequencies ft1 and ft2 may be 60 MHz and 120 MHz, respectively. Consequently, a measurable distance may be a maximum of 2.5 m.

FIG. 12(b) exemplarily shows that the mobile terminal 100 including the distance detecting device 200 outputs lights based on third and fourth frequencies ft3 and ft4 to an external target 40b spaced apart therefrom by a second distance Dtb at a second time Tb. For example, the third and fourth frequencies ft3 and ft4 may be 50 MHz and 100 MHz, respectively. Consequently, a measurable distance may be a maximum of 3 m.

FIG. 12(c) exemplarily shows that the mobile terminal 100 including the distance detecting device 200 outputs lights based on fifth and sixth frequencies ft5 and ft6 to an external target 40c spaced apart therefrom by a third distance Dtc at a third time Tc. For example, the fifth and sixth frequencies ft5 and ft6 may be 60 MHz and 90 MHz, respectively. Consequently, a measurable distance may be a maximum of 5 m.

For example, when 60 MHz and 120 MHz or 50 MHz and 100 MHz are used as two frequencies in a state in which the distance to the external target is 4 m, the distance may not be accurately measured.

In order to prevent this, in a case in which a frequency variable input is made based on a user input, the processor 270 may vary frequencies of transmission signals. For example, 60 MHz and 90 MHz may be selected as transmission frequencies.

In another example, the processor 270 of the distance detecting device 200 may divide the entire scanning section into a blank area that does not include an external target and an active area that includes an external target, and may perform distance measurement for the active area based on a level of a reception signal. At this time, it is assumed that the distance detecting device 200 does not output a light to the section corresponding to the blank area, i.e. the light source unit 210 does not output a light. In a case in which the level of the reception signal detected in the blank area is equal to or greater than a predetermined level, the processor may determine that another electronic device uses a frequency similar to the frequency used by the distance detecting device, and may vary the frequency that is currently being used in order to prevent this. For example, while using 60 MHz and 90 MHz, the processor 270 may change the frequencies to 120 MHz and 150 MHz. As a result, it is possible to stably perform distance detection without signal interference.

In a further example, while using 100 MHz and 150 MHz for approximately 60 frames, the processor 270 of the distance detecting device 200 may use 60 MHz and 150 MHz in a mixed state for any one of the frames. That is, while using 100 MHz and 150 MHz, at which the measurable distance is 3 m, the processor 270 may preliminarily use 60 MHz and 150 MHz in a mixed state, and may compare two results to determine whether accurate distance measurement is being performed within the measurable distance. Upon determining that an external target is located at a distance of 3 m or more, the processor 270 may change two frequencies that are being used. For example, the processor 270 may change the two frequencies to 60 MHz and 150 MHz. As a result, it is possible to perform accurate distance detection.

Meanwhile, a distance detecting method based on a code signal at the time of modulating an output light and a code signal at the time of demodulating a received light according to another embodiment of the present invention may be applied to the distance detecting device 200 according to the embodiment of the present invention described with reference to FIGS. 1 to 12, which will be described with reference to FIGS. 13 to 19.

Meanwhile, an absorption member to absorb a backscattered light generated in the distance detecting device according to a further embodiment of the present invention may be applied to the distance detecting device 200 according to the embodiment of the present invention described with reference to FIGS. 1 to 12, which will be described with reference to FIGS. 20 and 25.

Figure 13:
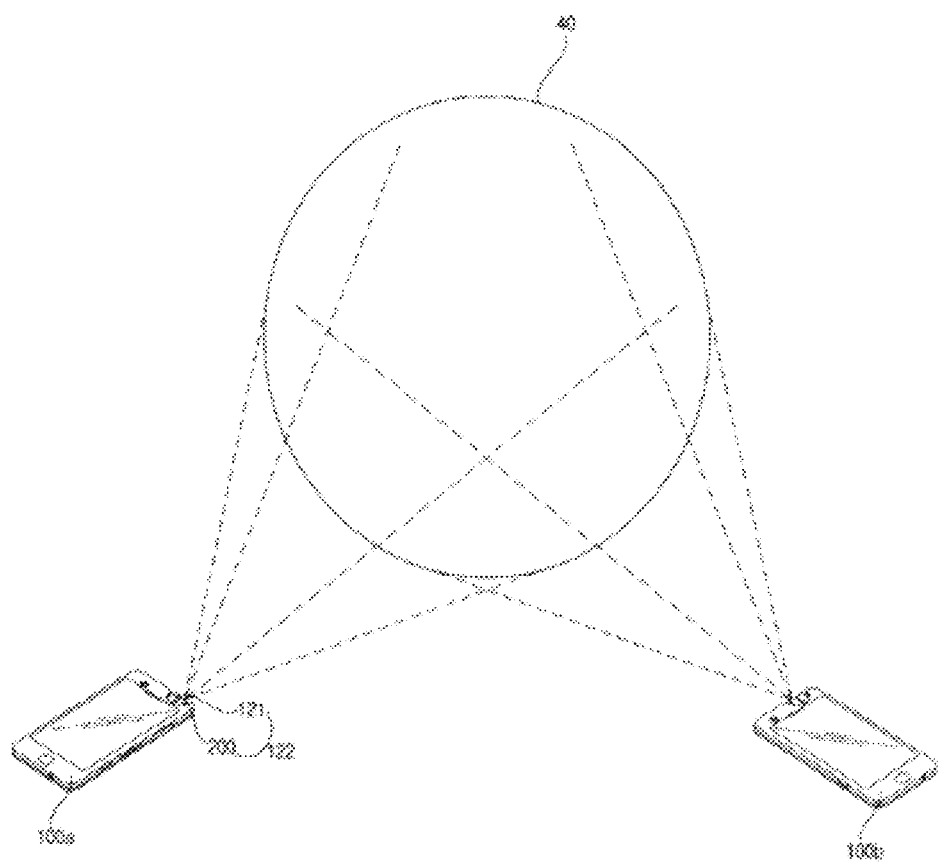
FIG. 13 is a view showing that light for distance detection is projected from an image processing apparatus including a distance detecting device according to another embodiment of the present invention.

FIG. 13 is a view showing that light for distance detection is projected from an image processing apparatus including a distance detecting device according to another embodiment of the present invention.

Referring to the figure, mobile terminals 100a and 100b are shown as an example of the image processing apparatus of FIG. 13. As previously described, a distance detecting device 200 may be mounted in an image processing apparatus, such as a mobile terminal, a TV, a set-top box, a media player, a game console, an electric home appliance, or a vehicle. Hereinafter, a description will be given based on the mobile terminals 100a and 100b.

Meanwhile, the distance detecting device 200 according to the embodiment of the present invention outputs a light based on at least one code signal to the external target 40, receives a light backscattered or reflected by the external target 40, and detects a distance using the difference between the output light and the received light.

Meanwhile, the figure exemplarily shows that the first mobile terminal 100a and the second mobile terminal 100b output respective lights to the external target 40. In this case, noise generated by an output light from another device may be added to the received light, which is backscattered or reflected by the external target 40, or interference between devices may occur.

In another embodiment of the present invention, the distance detecting device exhibits high resistance to noise. In particular, the distance detecting device 200 according to the embodiment of the present invention detects a distance based on a code signal at the time of modulating an output light and a code signal at the time of demodulating a received light. The code signal may be a code signal exhibiting high resistance to external noise. For example, the code signal may be a pseudo random noise code signal. Consequently, it is possible to accurately detect the distance to the external target.

Meanwhile, in a case in which the light source unit uses a plurality of output lights, and therefore code signals are added to the respective output lights, the distance detecting device 200 according to the embodiment of the present invention may use a plurality of output lights having different absorption factors. Consequently, it is possible to improve accuracy of the light received from the external target and thus to accurately detect the distance to the external target.

Meanwhile, in a case in which a plurality of code signals is used, the distance detecting device 200 according to the embodiment of the present invention may detect distance information per code signal, and may calculate final distance information based on the detected distance information. Consequently, it is possible to accurately detect the distance to the external target.

Meanwhile, the distance detecting device 200 according to the embodiment of the present invention may output a first light from the light source unit to a first external area, and may output a second light from the light source unit to a second external area, whereby it is possible to improve spatial resolution for distance detection.

Meanwhile, the distance detecting device 200 according to the embodiment of the present invention may horizontally scan the first output light and the second output light from the light source unit with respect to different horizontal lines, whereby it is possible to improve spatial resolution.

Meanwhile, the distance detecting device 200 according to the embodiment of the present invention may use a laser diode as the light source, whereby it is possible to increase the measurable distance and to improve distance resolution.

Meanwhile, the distance detecting device 200 according to the embodiment of the present invention may use a 2D scanner that is capable of sequentially performing first direction scanning and second direction scanning when outputting a light to the outside. Consequently, it is not necessary to use a plurality of scanners, whereby it is possible to miniaturize the distance detecting device 200. In addition, it is possible to reduce manufacturing cost. Meanwhile, the scanner was previously described with reference to FIGS. 2a and 2b, and therefore a description thereof will be omitted.

Meanwhile, the distance detecting device 200 according to the embodiment of the present invention may compare the received light with the output light, and may detect a distance using the difference therebetween. In particular, it is possible to detect the distance to the external target 40 based on a code signal at the time of modulation and a code signal at the time of demodulation. A distance detecting method will be hereinafter be described with reference to FIG. 16a and subsequent figures.

Figure 14:
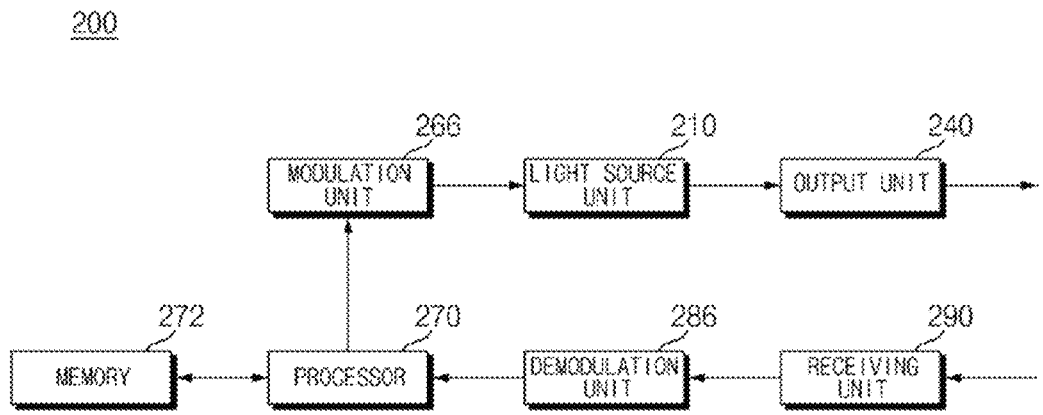
FIG. 14 is an internal block diagram showing an example of the distance detecting device of FIG. 13.

FIG. 14 is an internal block diagram showing an example of the distance detecting device of FIG. 13.

Referring to the figure, the distance detecting device 200 may include a light source unit 210, a scanner 240, a modulation unit 266, a processor 270, a memory 272, a demodulation unit 286, and a receiving unit 290.

The light source unit 210 may output a light having a predetermined wavelength. For example, the light source unit 210 may output a light having an infrared wavelength. However, the present invention is not limited thereto. The output light may be light having a visible wavelength, and various other examples may be possible.

Meanwhile, the light source unit 210 may output a light having at least one wavelength. For example, the light source unit 210 may output a light having a single wavelength. Alternatively, the light source unit 210 may output a plurality of lights having different wavelengths.

The modulation unit 266 may drive the light source unit 210 according to a control signal of the processor 270. For example, during operation of the distance detecting device 200, the modulation unit 266 may output at least one modulated code signal to the light source unit 210. That is, the modulation unit 266 may drive the light source unit 210 such that a light based on the code signal is output. At this time, the code signal may be a code signal exhibiting high resistance to external noise. For example, the code signal may be a pseudo random noise code signal.

The modulation unit 266 may modulate the code signal using various modulation methods. For example, various modulation methods, such as ASK, FSK, PSK, PCM, PWM, PPM, PDM, M-QAM, CDMA, and OFDM, may be used based on an input binary-based code signal.

Meanwhile, in a case in which the light source unit 210 outputs a light having a single wavelength, the modulation unit 266 may output a plurality of modulated code signals such that the code signals are added to the output light having the single wavelength. At this time, the code signals may be added to the output light at the same time. Alternatively, the code signals may be added to the output light at different times.

Meanwhile, in a case in which the light source unit 210 outputs a plurality of lights having different wavelengths, the modulation unit 266 may output a plurality of modulated code signals such that the code signals are added respectively to the output lights having different wavelengths. That is, the modulation unit 266 may drive the light source unit 210 such that different code signals may be added to different output lights.

As previously described, the output unit 240 may output the light output from the light source unit 210 to the outside. The output unit 240 may include a scanner that is capable of receiving the output light from the light source unit 210 and sequentially and repeatedly perform first direction scanning (horizontal scanning) and second direction scanning (vertical scanning) to the outside.

The operation of the scanner may be controlled based on a feedback signal for the horizontal scanning and a feedback signal for the vertical scanning.

The receiving unit 290 receives a light from the external target 40. Meanwhile, the light received from the external target 40 may be received through the output unit 240 without the provision of the receiving unit 290.

The receiving unit 290 may include a detection unit 280 (see FIG. 15) to convert the light received from the external target 40 into an electric signal. To this end, the detection unit may include a photodiode to convert an optical signal into an electric signal. In particular, the detection unit 280 may include a photodiode exhibiting a high photoelectric efficiency, such as an Avalanche photodiode to convert a weak light that is backscattered by the external target 40 and is then received into voltage.

The demodulation unit 286 may separate the code signal from the light received by the receiving unit 290. Specifically, in a case in which the receiving unit 290 includes a detection unit 280 (see FIG. 15), the demodulation unit 286 may separate the code signal from the converted electric signal. The separated code signal is transmitted to the processor 270.

The processor 270 controls operation of the modulation unit 266, etc.

Meanwhile, the processor 270 may generate a code signal using code signal information stored in the memory 272. In addition, the processor 270 may output the generated code signal to the modulation unit 266. Meanwhile, the processor 270 may receive the separated code signal from the demodulation unit 286. In addition, the processor 270 may detect the distance to the external target 40 based on the code signal for the modulation unit 266 and the code signal for the demodulation unit 286.

For example, the processor 270 may detect the distance to the external target based on a time difference between the code signal for the modulation unit 266 and the code signal for the demodulation unit 286.

Specifically, the processor 270 may select a code signal corresponding to the code signal used in the modulation unit 266 from among at least one code signal separated by the demodulation unit 286 using a correlation value between the code signal used in the modulation unit 266 and the at least one code signal separated by the demodulation unit 286, and may detect the distance to the external target based on a time difference between the selected code signal and the code signal used in the modulation unit 266.

Meanwhile, in a case in which a plurality of code signals is used, the processor 270 may detect a plurality of pieces of distance information to the external target based on a plurality of code signals for the modulation unit 266 and a plurality of code signals for the demodulation unit 286, and may calculate final distance information based on the pieces of distance information.

Meanwhile, the processor 270 may reconfigure the detected distance information into a 2D image as shown in FIG. 2*b* using horizontal and vertical sync signals from the scanner 240. The 2D image configured as described above may also be renewed several times or more per second into a video.

The memory 272 may store data necessary to control various operations of the distance detecting device 200. In particular, the memory 272 may store a code signal for the output light. When the processor 270 calculates the distance, the memory 272 may output the stored code signal to the processor 270.

In addition, when the distance information to the external target 40 is calculated, the memory 272 may store the distance information to the external target 40 per area, and may finally store the distance information to the entirety of the external target 40.

Figure 15:
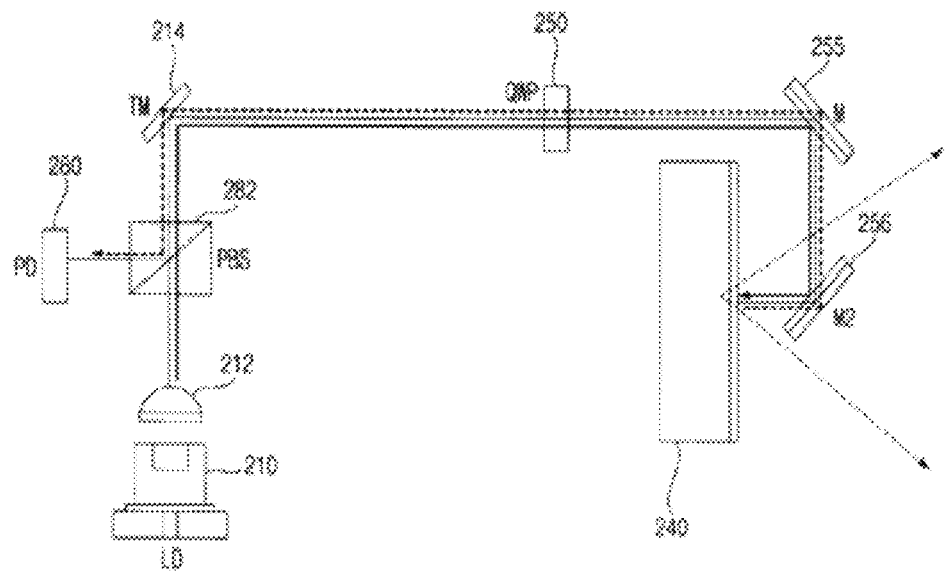
FIG. 15 is a view showing an example of the internal structure of the distance detecting device of FIG. 14.

FIG. 15 is a view showing an example of the internal structure of the distance detecting device of FIG. 14.

Referring to the figure, the distance detecting device may include a light source unit 210, a condensing unit 212, a light reflection unit 214, a scanner 240, a polarized beam conversion unit 250, a second light reflection unit 255, a third light reflection unit 256, a detection unit 280, and a polarized beam splitting unit 282.

Hereinafter, a description will be given of components of the distance detecting device other than the units (the light source unit 210, the scanner 240, and the detection unit 280) described with reference to FIG. 14.

The condensing unit 212 collimates a light output from the light source 210. To this end, the condensing unit 212 may include a collimate lens to collimate a light having a corresponding wavelength.

Subsequently, the output light, having passed through the condensing unit 212, passes through the polarized beam splitting unit 282.

In a case in which polarized beams of the output light and the received light having the same wavelength are different from each other, the polarized beam splitting unit 282 splits advancing directions of the lights from each other based on the polarization directions thereof. For example, the first polarized beam splitting unit 281 transmits a P polarized component of the output light, reflects an S polarized component of the received light, and transmits the received light to the detection unit 280. This polarized beam splitting unit may be called a polarizer beam splitter.

The light reflection unit 214 reflects the output light having passed through the polarized beam splitting unit 282 to the scanner 240, and reflects the light received through the scanner 240 to the first polarized beam splitting unit 282. The light reflection unit 214 may reflect light having different wavelengths in addition to the wavelength of the output light. To this end, the light reflection unit 214 may include a total mirror (TM).

The polarized beam conversion unit 250 may convert a polarization direction of the output light, and may convert a polarization direction of the received light.

For example, the polarized beam conversion unit 250 may provide a phase difference to control the polarization direction. The polarized beam conversion unit may convert a linearly polarized beam into a circularly polarized beam, or may convert a circularly polarized beam into a linearly polarized beam.

Specifically, the polarized beam conversion unit 250 converts a P polarized beam of the output light into a circularly polarized beam of the output light. Consequently, the scanner 240 may output the circularly polarized beam of the output light to the outside, and may receive a light having the circularly polarized beam from the outside. On the other hand, the polarized beam conversion unit 250 may convert a circularly polarized beam of the light received through the scanner 240 into an S polarized beam. For this reason, the polarized beam conversion unit 250 may be called a quarter wavelength plate (QWP).

In another example, the polarized beam conversion unit 250 may output the P polarized beam of the output light without conversion, and may convert a P polarized beam of the light received from the scanner 240 into an S polarized beam.

The second light reflection unit 255 reflects the output light having passed through the polarized beam conversion unit 250 to the scanner 240, and reflects the light received through the scanner 240 to the polarized beam conversion unit 250. The light reflection unit 255 may reflect light having different wavelengths in addition to the wavelength of the output light. To this end, the second light reflection unit 255 may include a total mirror.

The third light reflection unit 256 reflects the output light having passed through the second light reflection unit 255 to the scanner 240, and reflects the light received through the scanner 240 to the second light reflection unit 255. The third light reflection unit 256 may reflect light of different wavelengths in addition to the wavelength of the output light. To this end, the third light reflection unit 256 may include a total mirror.

Meanwhile, in the distance detecting device of FIG. 15, an optical path of the output light and an optical path of the received light partially overlap. A distance detecting device configured to have a structure in which an optical path of an output light and an optical path of a received light partially overlap may be called a coaxial optical system. The distance detecting device having the above structure may have a compact size, may be resistant to external light, and may exhibit a high signal to noise ratio.

On the other hand, an optical path of the output light and an optical path of the received light may be completely separated from each other. A distance detecting device configured to have a structure in which an optical path of output light and an optical path of received light are completely separated from each other may be called a separated optical system.

Figure 16:
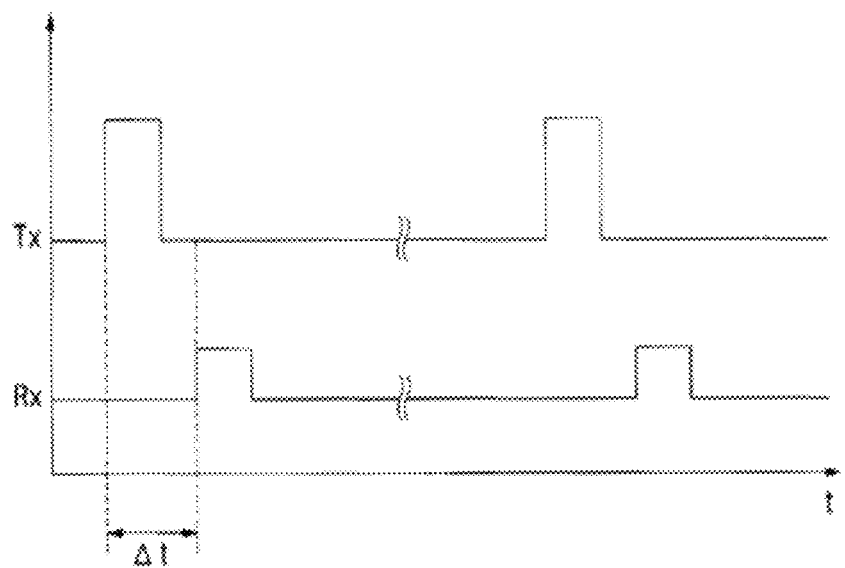
FIG. 16 is a reference view illustrating a distance detecting method performed by the distance detecting device of FIG. 14.

FIG. 16 is a reference view illustrating a distance detecting method performed by the distance detecting device of FIG. 14.

The processor 270 of the distance detecting device may calculate distance information based on a phase difference and a time difference between an electric signal for an output light and an electric signal for a received light, pulse counting thereof, etc.

FIG. 16 exemplarily shows a distance detecting method based on a time difference method. In the figure, Tx indicates a code signal of an output light, and Rx indicates a code signal of a received light. Referring to the figure, it is possible to calculate a distance information level based on a time difference $\Delta t$ between a code signal of an output light and a code signal of a received light. For example, when the time difference is large, which means that the external target 40 is distant, the distance information level may be set to high, and therefore a luminance level may be set to low. On the other hand, when the time difference is small, which means that the external target 40 is near, the distance information level may be set to low, and therefore the luminance level may be set to high.

Figure 17:
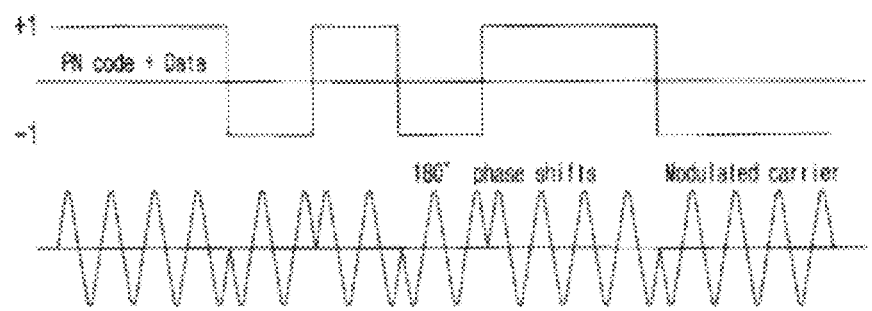
FIGS. 17 to 19 are reference views illustrating the operation of the distance detecting device of FIG. 14.
Figure 18A:
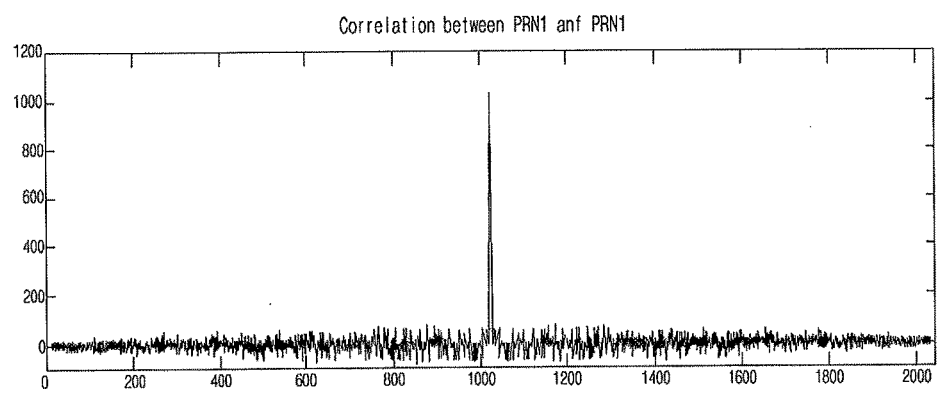
Figure 18B:
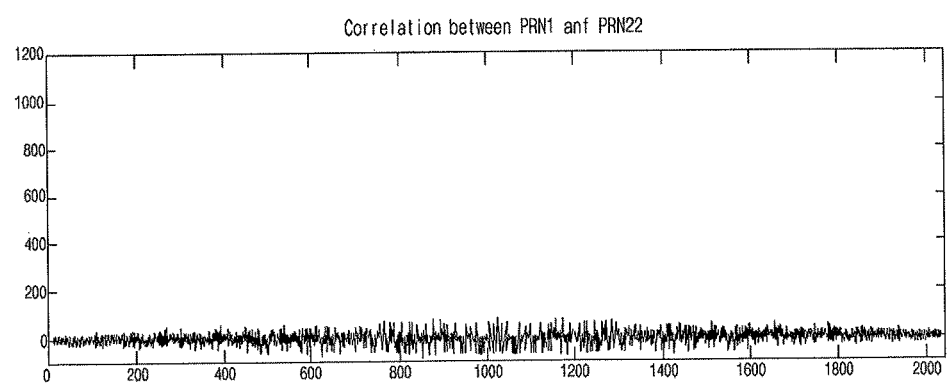
Figure 19:
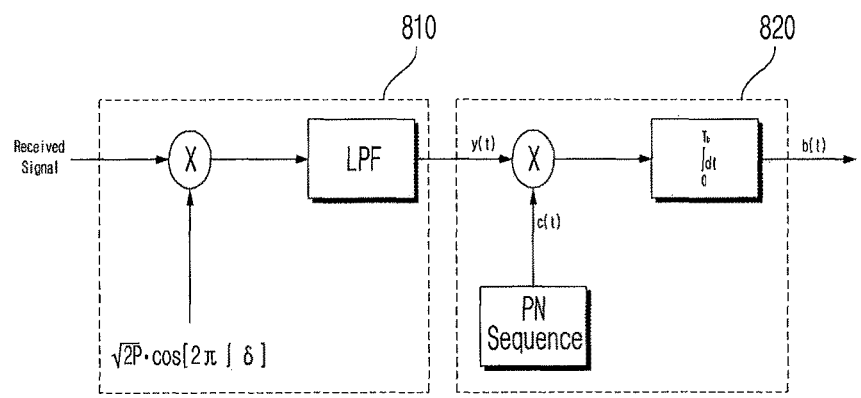

FIGS. 17 to 19 are reference views illustrating the operation of the distance detecting device of FIG. 14.

First, FIG. 17 exemplarily shows an example of a modulation method performed by the modulation unit 266. The figure exemplarily shows that a generated pseudo random noise corresponding to a code signal is BPSK modulated. That is, the figure exemplarily shows that, in a case in which a value of the pseudo random noise is 1 and −1, the phase of a carrier is changed to 0 and 180 degrees for modulation into an analog signal. Alternatively, any one selected from among widely known modulation methods (ASK, FSK, PSK, PCM, PWM, PPM, PDM, M-QAM, CDMA, OFDM, etc.) may be used.

Meanwhile, FIGS. 18a and 18b exemplarily show autocorrelation and cross-correlation characteristics in a case in which a pseudo random noise code signal is used as a code signal.

FIG. 18a exemplarily shows auto-correlation between the same code signals, and FIG. 18b exemplarily shows cross-correlation between different code signals.

The processor 270 may execute a correlation operation using a code signal used in the modulation unit 266 and a code signal separated by the demodulation unit 286. In a case in which the code signal used in the modulation unit 266 and the code signal separated by the demodulation unit 286 are the same code signals, a level increases in a specific band as shown in FIG. 18a. On the other hand, in a case in which the code signal used in the modulation unit 266 and the code signal separated by the demodulation unit 286 are different code signals, a level is low over the entire band as shown in FIG. 18b. That is, the code signals may be expressed as a noise component.

Meanwhile, FIG. 19 exemplarily shows a signal processing example of an electric signal detected by the detection unit.

The demodulation unit 286 may include a frequency conversion unit 810 of FIG. 19, and the processor 270 may include a despreading unit 820.

The frequency conversion unit 810 converts a carrier-based electric signal detected by the detection unit 280 into a baseband-based signal. To this end, a cosine function corresponding to a carrier frequency may be used, and a low pass filter may be used.

Next, the despreading unit 820 executes a correlation operation for the baseband-based signal and the pseudo random noise code signal.

The processor 270 may despread the code signal spread by the modulation unit 266, and may extract the distance information to the external target using a level having high correlation.

That is, the processor 270 may recognize time delay based on the transmission code signal and the reception code signal while executing a correlation operation using the code signal used in the modulation unit 266 and the code signal separated by the demodulation unit 286. In addition, the processor may calculate distance information in consideration of the recognized time delay.

Specifically, during execution of the correlation operation, the processor 270 may find a proper code from a transmission code set (1, 2, . . . , N, . . . , K−1, and K), and may find a time value during which the corresponding code is delayed with respect to the transmission signal to calculate the distance to the external target 40. For example, in a case I which code N is despread together with code M (≠N), code N does not have a peak value. For this reason, research is carried out while changing the code until the code has a peak value. When a code having a peak value is found, the processor may confirm how many times the code is circularly shifted to have the peak value to find out delayed time.

In a case in which the pseudo random noise code signal is used as the code signal as described above, it is possible to easily find the transmission code even in a state in which a large amount of noise is present. Consequently, it is possible to accurately detect the distance to the external target.

Meanwhile, in another embodiment of the present invention, the distance detecting device 200 may output a light having a single wavelength in a state of adding a plurality of code signals thereto. That is, the distance detecting device may output a light having a first code signal and a second code signal added thereto in the same time zone.

For example, the processor 270 may overlap all transmission codes c1, c2, . . . , and en perpendicular to each other to prepare a code C, and the modulation unit 266 may perform modulation based on the code C to drive the light source unit 210 such that a light having a plurality of codes added thereto is output. The output unit 240 outputs a light having a plurality of codes added thereto.

At this time, a code signal based on a light that is reflected or backscattered by the external target 40 and is then received may be a delayed code Cr. The processor 270 executes correlation between the codes c1, c2, . . . , and en and the received code Cr. Then, the processor calculates times t1, t2, . . . , and tn at which the maximum value of the correlation obtained from the codes c1, c2, . . . , and en is acquired. Finally, the processor averages the values of t1, t2, . . . , and tn, or may obtain an output value T using an input value of a specific algorithm. The processor 270 calculates the final distance to the external target based on the output value T.

Meanwhile, in a case in which the calculate t1, t2, . . . , and tn have the same Gaussian distribution, the output value T has a variation of 1/n while having the same mean value as t1, t2, . . . , and tn. Consequently, it is possible to obtain an output value T having higher accuracy. In a case in which n codes are used for one beam (output light), therefore, an n times measurement effect is obtained, whereby it is possible to improve accuracy in distance measurement.

Meanwhile, in another embodiment of the present invention, the distance detecting device 200 may output a light having a single wavelength in a state of adding a plurality of code signals thereto. At this time, the output unit 240 may output a light having a first code signal, selected from among a plurality of code signals, added thereto for a first period, and may output a light having a second code signal, selected from among the code signals, added thereto for a second period. Meanwhile, the processor 270 may perform distance detection using the transmission code and the reception code.

In a case in which a plurality of code signals is used as described above, it is possible to improve accuracy of a light received from the external target. In addition, it is possible to accurately detect the distance to the external target.

Meanwhile, in another embodiment of the present invention, the light source unit 210 of the distance detecting device 200 may include a first light source to output a first light having a first wavelength and a second light source to output a second light having a second wavelength, and the modulation unit 266 may add a first code signal, selected from among a plurality of code signals, to the first output light and may add a second code signal, selected from among the code signals, to the second output light. That is, it is possible to output the first light and the second light in the same time zone. Meanwhile, the processor 270 may perform distance detection using the transmission code and the reception code.

Meanwhile, in another embodiment of the present invention, the light source unit 210 of the distance detecting device 200 may include a first light source to output a first light having a first wavelength and a second light source to output a second light having a second wavelength, the modulation unit 266 may add a first code signal, selected from among a plurality of code signals, to the first output light and may add a second code signal, selected from among the code signals, to the second output light, and the output unit 240 may output the first light for a first period and may output the second light for a second period. Meanwhile, the processor 270 may perform distance detection using the transmission code and the reception code.

Meanwhile, in another embodiment of the present invention, the light source unit 210 of the distance detecting device 200 may include a first light source to output a first light having a first wavelength and a second light source to output a second light having a second wavelength, and the output unit 240 may output the first light to a first external area and may output the second light to a second external area. Meanwhile, the processor 270 may perform distance detection using the transmission code and the reception code.

Meanwhile, in a further embodiment of the present invention, the light source unit 210 of the distance detecting device 200 may include a first light source to output a first light having a first wavelength and a second light source to output a second light having a second wavelength, the output unit 240 may include a scanner that sequentially performs first direction scanning and second direction scanning and outputs a modulated light to an external area, and the scanner may output the first light and the second light to the outside such that the first output light and the second output light are horizontally scanned with respect to different horizontal lines.

For example, on the assumption that a time during which the light output from the output unit 240 moves from a first pixel to a second pixel of the external target 40 is Tpixel, and a change angle therebetween is Apixel, when beams (output lights) are arranged such that an angular distance between the respective beams is Apixel/N, each k-th beam may converge on a distance value of a position which the beam passes at Tpixel/2+k/N*Tpixel seconds. Each k-th beam is modulated by a code ck, selected from among the codes c1, c2, . . . , and en. Consequently, the processor 270 may calculate distance information based on a code of each beam. In a case in which N output lights are used, therefore, it is possible to increase spatial resolution N times.

Meanwhile, the distance detecting device 200 according to the embodiment of the present invention outputs a light from the light source unit to the external target 40, receives a light backscattered or reflected by the external target 40, and detects the distance to the external target based on the difference between the output light and the received light. In particular, the distance detecting device uses an absorption member to absorb a backscattered light generated in a polarized beam splitting unit 282 (see FIG. 2) that transmits some of the output light and the received light and reflects some of the output light and the received light. Consequently, it is possible to conveniently detect the distance to the external target 40 while removing the internal backscattered light. As a result, noise generated by the internal backscattered light is considerably lowered than that generated by the light that is backscattered by the external target 40 and is then received. Consequently, it is possible to increase a measurable distance and to improve distance resolution. Meanwhile, an absorption member to absorb a backscattered light generated in a distance detecting device according to another embodiment of the present invention may be applied to the distance detecting device 200 according to the embodiment of the present invention described with reference to FIGS. 13 to 19.

Figure 20:
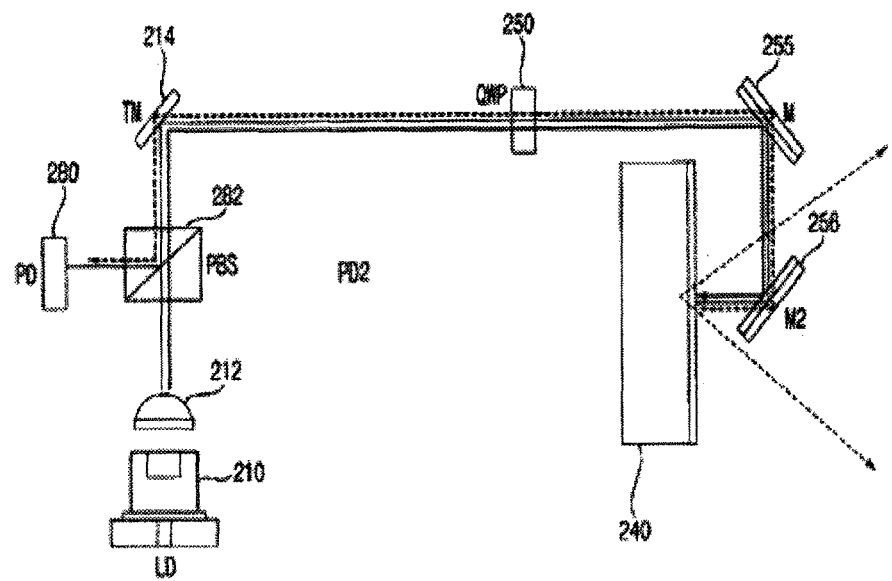
FIG. 20 is a view showing an example of the internal structure of a distance detecting device according to a further embodiment of the present invention.

FIG. 20 is a view showing an example of the internal structure of a distance detecting device according to a further embodiment of the present invention.

The internal structure of the distance detecting device of FIG. 20 may be identical to that of the distance detecting device of FIG. 15. The distance detecting device has been already described with reference to FIG. 15, and therefore a description thereof will be omitted.

Meanwhile, the processor 270 of the distance detecting device according to the embodiment of the present invention may perform distance detection using the distance calculation method based on the time difference method as shown in FIG. 16 or the phase difference method as shown in FIG. 3.

Figure 21A:
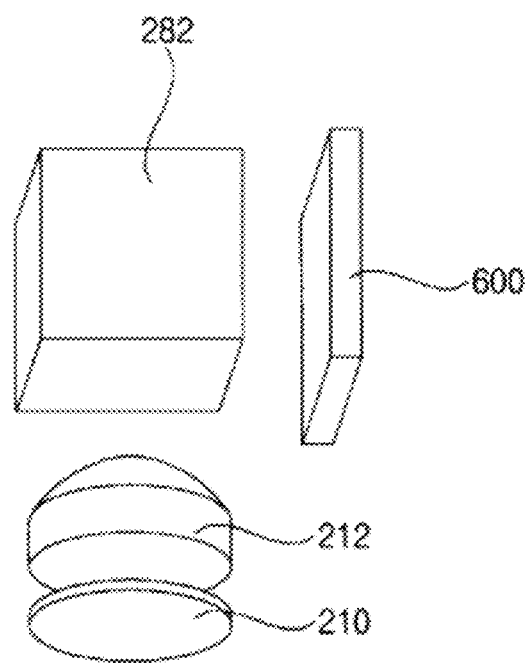
FIGS. 21a to 21c are reference views illustrating a backscattered light in the distance detecting device.
Figure 21B:
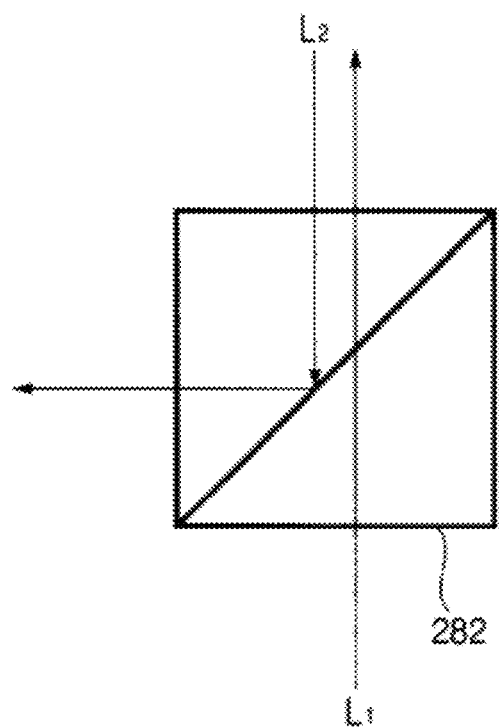
Figure 21C:
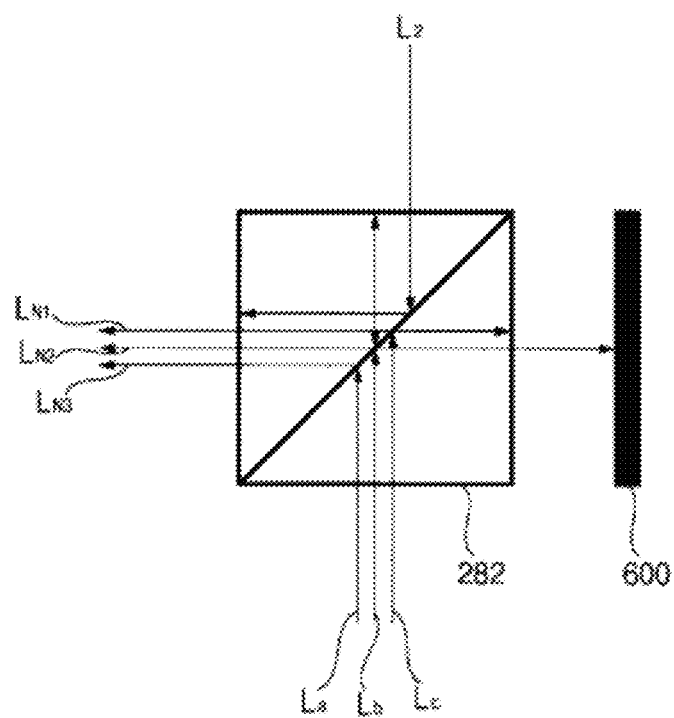

FIGS. 21a to 21c are reference views illustrating a backscattered light in the distance detecting device.

First, FIG. 21a exemplarily shows a light source unit 210, a condensing unit 212, a polarized beam splitting unit 282, and a structure 600 in the distance detecting device.

The condensing unit 212 collimates a light output from the light source 210. To this end, the condensing unit 212 may include a collimate lens to collimate a light having a corresponding wavelength.

In a case in which polarized beams of the output light and the received light having the same wavelength are different from each other, the polarized beam splitting unit 282 splits advancing directions of the lights from each other based on the polarization directions thereof. For example, the first polarized beam splitting unit 282 transmits a P polarized component of the output light, reflects an S polarized component of the received light, and transmits the received light to the detection unit 280. This polarized beam splitting unit may be called a polarizer beam splitter.

Meanwhile, another optical part, i.e. the structure 600, may be disposed in the vicinity of the polarized beam splitting unit 282. The figure exemplarily shows that the structure 600 is disposed at the right side of the polarized beam splitting unit 282. That is, the structure 600 may be disposed in a direction opposite to the detection unit 280.

Next, FIG. 21b exemplarily shows light transmission and light reflection of the polarized beam splitting unit 282. That is, the polarized beam splitting unit 282 may transmit a light L1 output from the light source unit 210, may reflect a light L2 received from the outside, and transmit the received light to the detection unit 280. In particular, the polarized beam splitting unit 282 may transmit a P polarized beam, and may reflect an S polarized beam.

Next, FIG. 21c exemplarily shows that a backscattered light is generated in the polarized beam splitting unit 282.

The polarized beam splitting unit 282 may transmit a P polarized beam, and may reflect an S polarized beam. The reflected S polarized beam L2 includes noise 1 LN1 that is transmitted through the polarized beam splitting unit 282, is reflected by the structure 600, and is then received, and noise 2 LN2 that is reflected again in the polarized beam splitting unit 282, and is then received. In addition, beams La, Lb, and Lc transmitted through the polarized beam splitting unit 282 in a P polarized state may include noise 1 LN1 that is reflected again in the polarized beam splitting unit 282, is reflected by a surface of the polarized beam splitting unit 282, and is then received. Furthermore, noise 3 LN3 that is multiple-reflected in the polarized beam splitting unit 282, and is then received may be included. These noises are generated by the backscattered light generated in the polarized beam splitting unit 282.

Meanwhile, a beam backscattered by the external target 40, from among the beams transmitted through the polarized beam splitting unit 282 in the P polarized state, is reflected by the surface of the polarized beam splitting unit 282, and is received as a weak signal.

At this time, a ratio of the weak signal backscattered by the external target 40 to the noise generated by the internal backscattered light is a signal to noise ratio (SNR). At this time, a distance in which an SNR of at least 1 is maintained may be a measurable distance. In order to maintain an SNR of 1 or higher within a target measurement distance, it is necessary to reduce noises generated by the internal backscattered light. Hereinafter, a description will be given of an absorption member to reduce noises generated by the backscattered light in the distance detecting device.

Figure 22A:
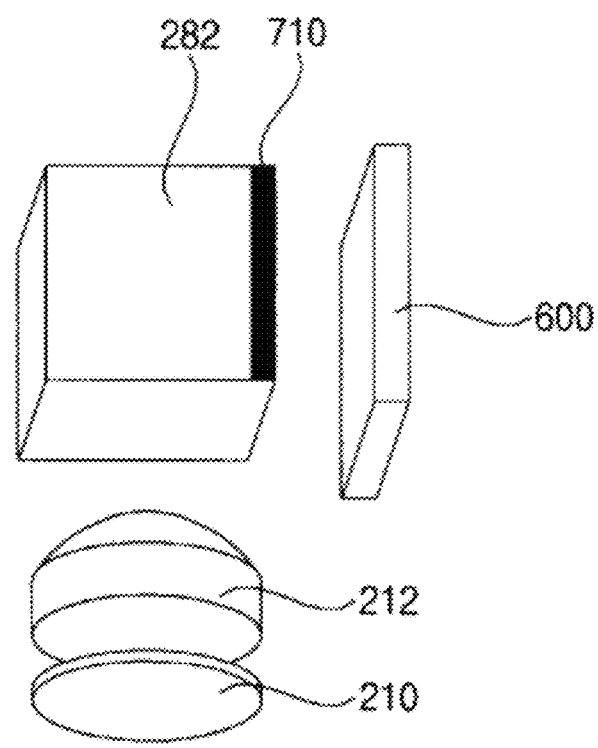
FIGS. 22a to 22e are views showing various examples of an absorption member in the distance detecting device according to the embodiment of the present invention.
Figure 22B:
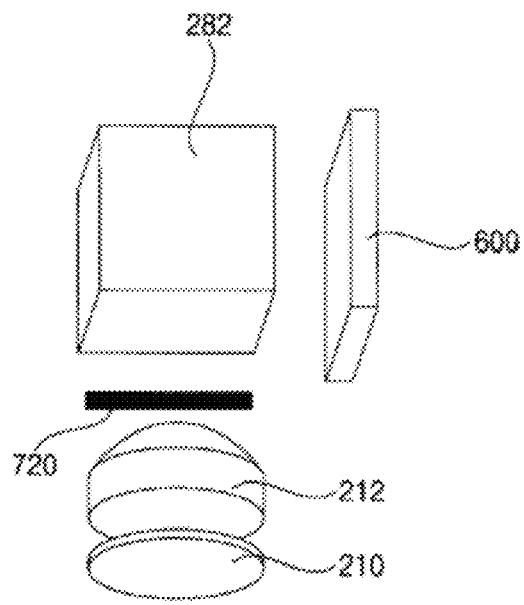
Figure 22C:
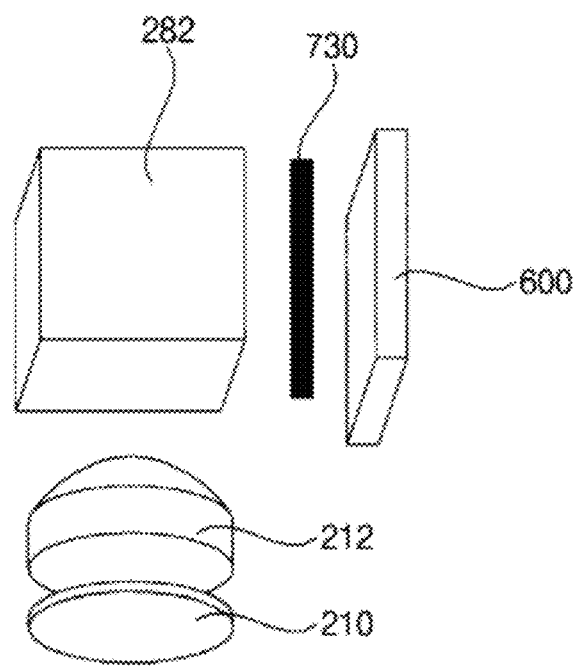

FIGS. 22a to 22c are views showing various examples of an absorption member in the distance detecting device according to the embodiment of the present invention.

First, FIG. 22a exemplarily shows a black painting 710 attached to the polarized beam splitting unit 282.

That is, a portion between the polarized beam splitting unit 282 and the structure 600, specifically the right side surface of the polarized beam splitting unit 282, may be ground and coated with a black painting 710 to absorb a beam transmitted through the polarized beam splitting unit 282, thereby reducing noises 1 and 2 LN1 and LN2.

Next, FIG. 22b exemplarily shows a polarizing member 720 disposed between the polarized beam splitting unit 282 and the light source unit 210, specifically between the polarized beam splitting unit 282 and the condensing unit 212. The polarizing member 720 may be a polarizer.

That is, a beam is transmitted through the polarizer 720 before being transmitted through the polarized beam splitting unit 282 in order to increase polarization contrast. Consequently, it is possible to reduce noises 1 and 2 LN1 and LN2 generated when an S polarized beam is reflected.

Next, FIG. 22c exemplarily shows a photosensitive filter 730 disposed between the polarized beam splitting unit 282 and the structure 600. The photosensitive filter 730 may be an absorptive ND filter.

That is, it is possible to reduce intensity of a beam directed from the polarized beam splitting unit 282 to the structure 600 by using the photosensitive filter 730. As a result, it is possible to reduce noise.

Figure 22D:
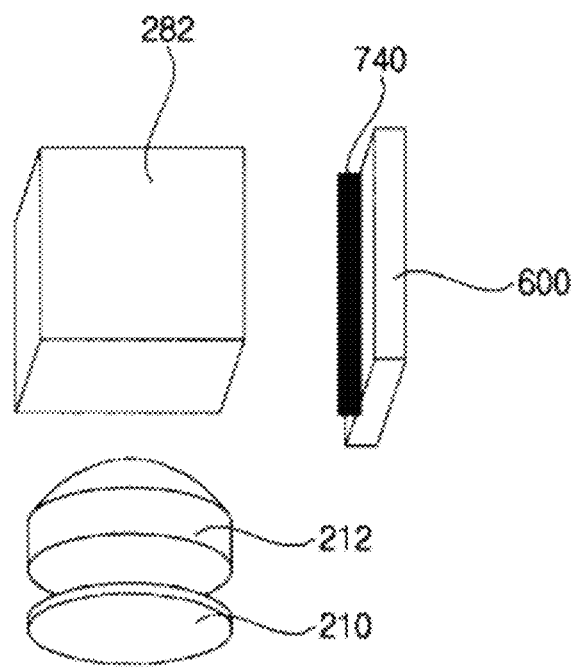

Next, FIG. 22d exemplarily shows a black coating 740 formed at the surface of the structure 600. The black coating 740 may be a black optical coating.

That is, it is possible to reduce reflection of light from the structure 600 through absorption by using the black coating 740. As a result, it is possible to reduce noise.

Figure 22E:
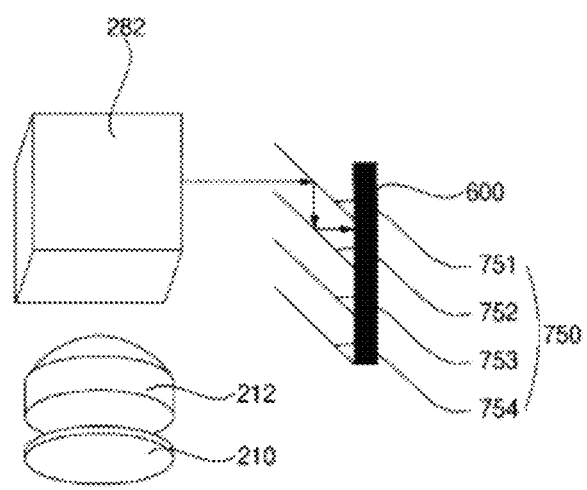

Next, FIG. 22e exemplarily shows a multiple-reflection channel member 750 attached to the structure 600.

Specifically, the multiple-reflection channel member 750 is attached to the structure 600 in an inclined state to generate multiple-reflection. Consequently, it is possible to reduce the amount of light reflected from the structure 600, thereby reducing noise.

Meanwhile, at least two selected from among the methods of FIGS. 22a to 22e may be used together in order to minimize noise.

Figure 23:
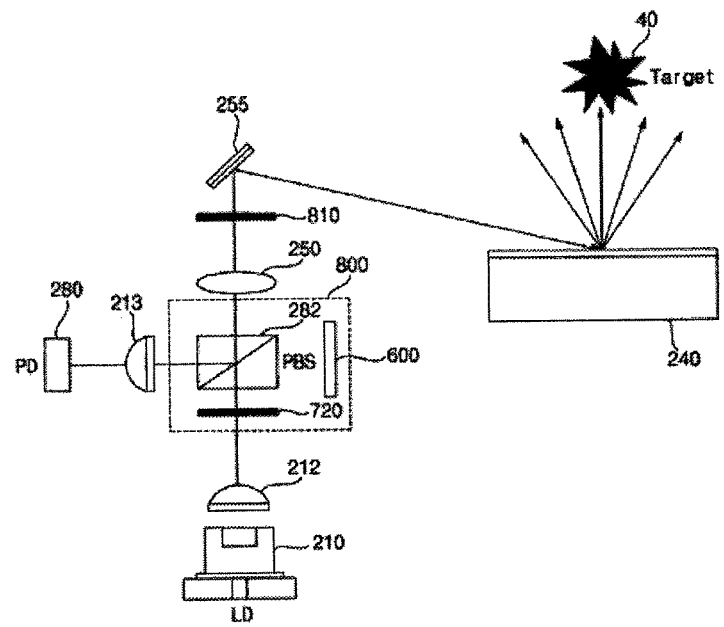
FIG. 23 is a view showing another example of the internal structure of the distance detecting device according to the embodiment of the present invention.

FIG. 23 is a view showing another example of the internal structure of the distance detecting device according to the embodiment of the present invention.

FIG. 23 exemplarily shows a schematic internal structure of the distance detecting device. In particular, the figure exemplarily shows a schematic internal structure of a distance detecting device adopting the method of FIG. 22b, selected from among the methods of FIGS. 22a to 22e for reducing the internal backscattered light.

In the distance detecting device of FIG. 23, the light source unit 210, the polarized beam splitting unit 282, and the polarized beam conversion unit 250 may be arranged on an optical path in line. In addition, the light source unit 210 may output a light having a first-direction polarized beam. That is, the light source unit 210 may output a light having a P polarized beam.

In a case in which the light source unit 210 is a laser diode (LD), a polarization member 720 of FIG. 22b is used in order to increase polarization contrast since a polarization ratio of the LD is 100:1. That is, a light output from the LD passes through the polarizer 720, and a P polarized beam of the light is transmitted through the polarized beam splitting unit 282. The quarter wavelength plate (QWP) 250 converts the P polarized beam into a circularly polarized beam, and the scanner 240 scans the external target 40.

The light that is backscattered by the external target 40 and is then received in a state of the circularly polarized beam is converted into an S polarized beam by the quarter wavelength plate (QWP) 250. Since the polarized beam splitting unit 282 reflects the S polarized beam of the received light, the detection unit 280 receives the light backscattered by the external target 40.

The detection unit 280 converts the received light, which is reflected by the polarized beam splitting unit 282 and is then condensed by a condensing unit 213, into an electric signal. The processor 270 calculates the distance to the external target 40 based on the electric signal from the detection unit 280.

According to the structure of FIG. 23, light is transmitted through the polarizing member 720 before being transmitted through the polarized beam splitting unit 282, whereby it is possible to increase polarization contrast. Of course, it is not possible to provide a 100% linearly polarized beam. Since the polarization contrast is increased, however, a P polarized beam component of the output light is increased, thereby improving SNR in spite of internal noise.

Meanwhile, in order to reduce noise generated by the internal backscattered light, at least one selected from among the black painting 710 attached to the polarized beam splitting unit 282 of FIG. 22a, the photosensitive filter 730 disposed between the polarized beam splitting unit 282 and the structure 600 of FIG. 22c, the black coating 740 formed at the surface of the structure 600 of FIG. 22d, and the multiple-reflection channel member 750 attached to the structure 600 of FIG. 22e may be further used in addition to the polarizing member 720 of FIG. 23.

Meanwhile, the figure exemplarily shows that the scanner 240 receives the light backscattered by the external target 40. Alternatively, an additional receiving unit may be provided to receive the light backscattered by the external target 40. In this case, the output light and the received light are separated from each other. For this reason, the distance detecting device may be called a separated optical system.

Figure 24:
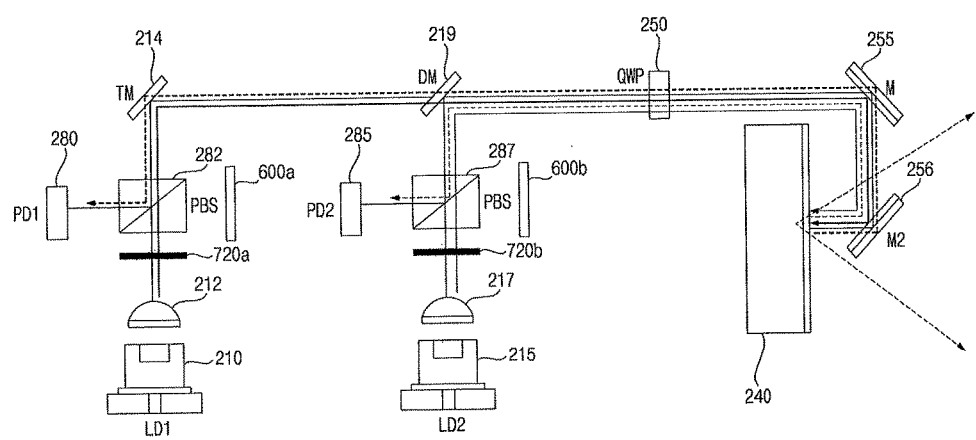
FIG. 24 is a view showing another example of the internal structure of the distance detecting device according to the embodiment of the present invention.

FIG. 24 is a view showing another example of the internal structure of the distance detecting device according to the embodiment of the present invention.

The distance detecting device of FIG. 24 is different from the distance detecting device of FIG. 23 in that two light source units are provided.

The distance detecting device of FIG. 24 may include a first light source unit 210, a first condensing unit 212, a light reflection unit 214, a second light source unit 215, a second condensing unit 217, a light wavelength splitting unit 219, a scanner 240, a polarized beam conversion unit 250, a second light reflection unit 255, a third light reflection unit 256, a first detection unit 280, a first polarized beam splitting unit 282, a second detection unit 285, and a second polarized beam splitting unit 287.

Hereinafter, a description will be given based on the difference from FIG. 23.

The first condensing unit 212 and the second condensing unit 217 collimate lights output from the first light source 210 and the second light source unit 215, respectively. To this end, the first condensing unit 212 and the second condensing unit 217 may each include a collimate lens to collimate a light having a corresponding wavelength.

Subsequently, the first output light, having passed through the first condensing unit 212, passes through the first polarized beam splitting unit 282 via a first polarizing member 720a, and the second output light, having passed through the second condensing unit 217, passes through the second polarized beam splitting unit 282 via a second polarizing member 720b.

The light reflection unit 214 reflects the first output light having passed through the polarized beam splitting unit 282 to the scanner 240, and reflects the first light received through the scanner 240 to the first polarized beam splitting unit 282. The light reflection unit 214 may reflect light having different wavelengths in addition to the wavelength of the first output light. To this end, the light reflection unit 214 may include a total mirror.

The light wavelength splitting unit 219 may reflect or transmit light based on a wavelength of the light. For example, the light wavelength splitting unit 219 may be embodied by a dichroic mirror. Specifically, the light wavelength splitting unit 219 may transmit a light having a first wavelength, and may reflect a light having a second wavelength.

Consequently, the light wavelength splitting unit 219 may transmit the first output light such that the first output light is transmitted to the scanner 240, and may reflect the second output light such that the second output light is transmitted to the scanner 240.

In addition, the light wavelength splitting unit 219 may transmit the first received light such that the first received light is transmitted to the light reflection unit 214, and may reflect the second received light such that the second received light is transmitted to the second polarized beam splitting unit 287.

The polarized beam conversion unit 250 may convert a polarization direction of the output light, and may convert a polarization direction of the received light.

For example, the polarized beam conversion unit 250 may provide a phase difference to control the polarization direction. In addition, the polarized beam conversion unit may convert a linearly polarized beam into a circularly polarized beam, or may convert a circularly polarized beam into a linearly polarized beam.

The second light reflection unit 255 reflects the first and second output lights having passed through the polarized beam conversion unit 250 to the scanner 240, and reflects the first and second lights received through the scanner 240 to the polarized beam conversion unit 250. The light reflection unit 255 may reflect light having different wavelengths in addition to the wavelengths of the first and second output lights. To this end, the light reflection unit 255 may include a total mirror.

The third light reflection unit 256 reflects the first and second output lights having passed through the second light reflection unit 255 to the scanner 240, and reflects the first and second lights received through the scanner 240 to the second light reflection unit 255. The third light reflection unit 256 may reflect light having different wavelengths in addition to the wavelengths of the first and second output lights. To this end, the third light reflection unit 256 may include a total mirror.

The first detection unit 280 converts the first received light, which is reflected by the first polarized beam splitting unit 282, into an electric signal, and the second detection unit 282 converts the second received light, which is reflected by the second polarized beam splitting unit 282, into an electric signal. The processor 270 calculates the distance to the external target 40 based on the electric signals from the first detection unit 280 and the second detection unit 282.

Meanwhile, in order to reduce noise generated by the internal backscattered light, at least one selected from among the black painting 710 attached to the polarized beam splitting unit 282 of FIG. 22a, the photosensitive filter 730 disposed between the polarized beam splitting unit 282 and the structure 600 of FIG. 22c, the black coating 740 formed at the surface of the structure 600 of FIG. 22d, and the multiple-reflection channel member 750 attached to the structure 600 of FIG. 22e may be further used in addition to the polarizing members 720a and 720b of FIG. 24.

Figure 25:
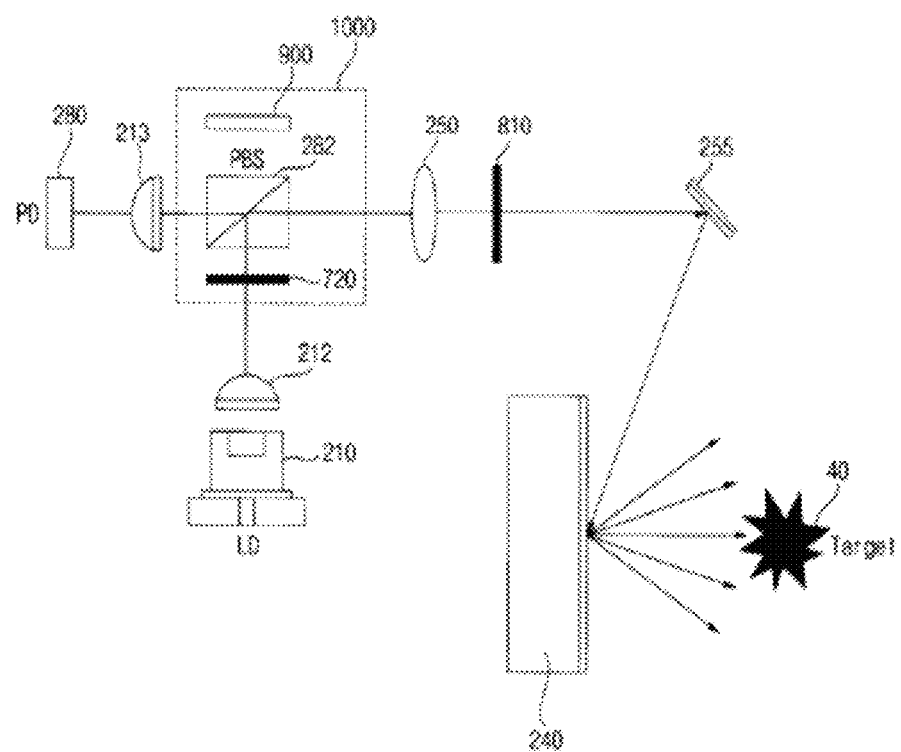
FIG. 25 is a view showing a further example of the internal structure of the distance detecting device according to the embodiment of the present invention.

FIG. 25 is a view showing a further example of the internal structure of the distance detecting device according to the embodiment of the present invention.

As compared with FIG. 23, the internal structure of the distance detecting device of FIG. 25 has a difference in that the light source unit 210 and the detection unit 280 are differently disposed.

That is, in the distance detecting device of FIG. 25, the detection unit 280, the polarized beam splitting unit 282, and the polarized beam conversion unit 250 may be arranged on an optical path in line. In addition, the light source unit 210 outputs a light having a second-direction polarized beam, i.e. an S polarized beam.

That is, the polarized beam splitting unit 282 reflects an output light having an S polarized beam such that the output light is transmitted to the scanner 240, and transmits a received light having a p polarized beam. Subsequently, the received light is transmitted to the detection unit 280 via the condensing unit 213.

Meanwhile, in the same manner as in FIG. 23, the polarization member 720 of FIG. 22b is used between the condensing unit 212 and the polarized beam splitting unit 282 in order to increase polarization contrast.

According to the structure of FIG. 25, light is transmitted through the polarizing member 720 before being transmitted through the polarized beam splitting unit 282, whereby it is possible to increase polarization contrast. Of course, it is not possible to provide a 100% linearly polarized beam. Since the polarization contrast is increased, however, an S polarized beam component of the output light is increased, thereby improving SNR in spite of internal noise.

Meanwhile, in order to reduce noise generated by the internal backscattered light, at least one selected from among the black painting 710 attached to the polarized beam splitting unit 282 of FIG. 22a, the photosensitive filter 730 disposed between the polarized beam splitting unit 282 and the structure 600 of FIG. 22c, the black coating 740 formed at the surface of the structure 600 of FIG. 22d, and the multiple-reflection channel member 750 attached to the structure 600 of FIG. 22e may be further used in addition to the polarizing member 720 of FIG. 25.

Meanwhile, the figure exemplarily shows that the scanner 240 receives the light backscattered by the external target 40. Alternatively, an additional receiving unit may be provided to receive the light backscattered by the external target 40. In this case, the output light and the received light are separated from each other. For this reason, the distance detecting device may be called a separated optical system.

Figure 26:
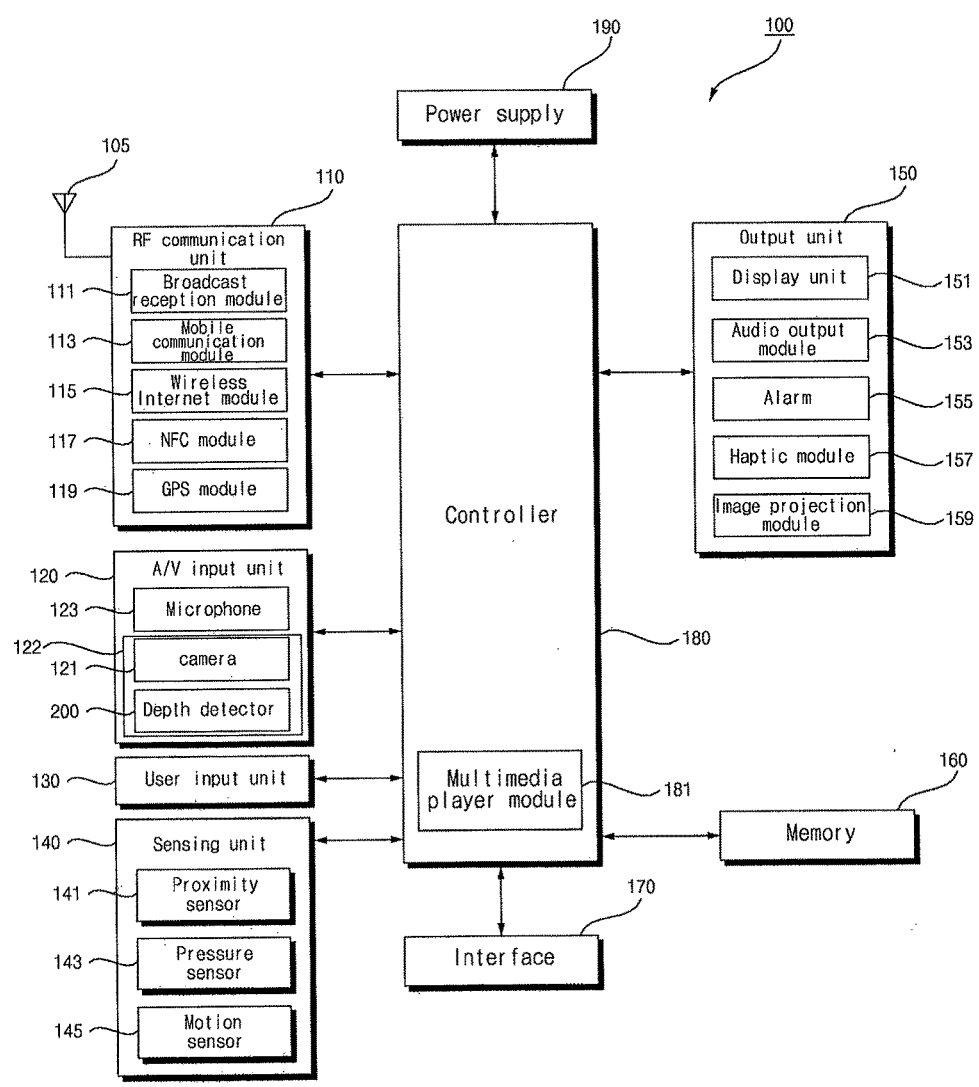
FIG. 26 is an internal block diagram showing a mobile terminal of FIG. 1.

FIG. 26 is an internal block diagram showing the mobile terminal of FIG. 1.

Referring to FIG. 26, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190.

The wireless communication unit 110 may include a broadcast receiving module 111, a mobile communication module 113, a wireless Internet module 115, a near field communication (NFC) module 117, and a global positioning system (GPS) module 119.

The broadcast receiving module 111 may receive at least one selected from between a broadcast signal and broadcast-related information from an external broadcast management server through a broadcast channel. At this time, the broadcast channel may include a satellite channel and a terrestrial channel.

The broadcast signal and/or broadcast-related information received through the broadcast receiving module 111 may be stored in the memory 160.

The mobile communication module 113 transmits and receives a wireless signal to and from at least one selected from among a base station, an external terminal, and a server on a mobile communication network. The wireless signal may include a voice call signal, a video communication call signal, or various types of data based on text/multimedia message transmission and reception.

The wireless Internet module 115 is a module for wireless Internet connection. The wireless Internet module 115 may be mounted inside or outside the mobile terminal 100.

The NFC module 117 may perform near field communication. In a case in which the NFC module 117 is within a predetermined distance from an NFC device (not shown), i.e. the NFC module 117 performs tagging, the NFC module 117 may receive predetermined data from the NFC device.

The global positioning system (GPS) module 119 may receive position information from a plurality of artificial GPS satellites.

The A/V input unit 120 is provided for audio signal or video signal input. The A/V input unit 120 may include a camera 121, a distance detection unit 200, and a microphone 123.

The distance detection unit 200 according to the embodiment of the present invention may be a subminiature type distance detecting device.

Specifically, a distance detection unit 200 according to a first embodiment of the present invention may calculate a final distance to an external target based on a plurality of transmission signals and reception signals as described with reference to FIGS. 1 to 12.

Meanwhile, a distance detection unit 200 according to a second embodiment of the present invention may detect the distance to an external target based on a code signal at the time of modulating an output light and a code signal at the time of demodulating a received light as described with reference to FIGS. 13 to 19.

Meanwhile, a distance detection unit 200 according to a third embodiment of the present invention may include an absorption member to absorb a backscattered light generated in the distance detecting device as described with reference to FIGS. 20 to 25.

Meanwhile, the distance detection unit 200 may be provided in a 3D camera 122 together with the camera 121.

Meanwhile, the calculated distance information may be transmitted to the controller 180 such that calculated distance information is used to display, particularly, a 3D image during reproduction of multimedia, or may be transmitted to the outside.

The user input unit 130 generates key input data input by a user to control the operation of the terminal. To this end, the user input unit 130 may include a keypad, a dome switch, and a touch pad (static pressure or electrostatic). Particularly in a case in which the touch pad forms a layered structure together with a display unit 151, which will hereinafter be described, an assembly of the touch pad and the display unit 151 may be called a touchscreen.

The sensing unit 140 may sense the present state of the mobile terminal 100, such as an open or closed state of the mobile terminal 100, the position of the mobile terminal 100, and whether user contact has been performed, to generate a sensing signal to control the operation of the mobile terminal 100.

The sensing unit 140 may include a proximity sensor 141, a pressure sensor 143, and a motion sensor 145. The motion sensor 145 may sense the motion or position of the mobile terminal 100 using an acceleration sensor, a gyro sensor, and a gravity sensor. In particular, the gyro sensor is a sensor to measure angular velocity. The gyro sensor may sense a direction (angle) rotated from a reference direction.

The output unit 150 may include a display unit 151, an acoustic output module 153, an alarm unit 155, and a haptic module 157.

The display unit 151 outputs, i.e. displays, information processed by the mobile terminal 100.

Meanwhile, in a case in which the display unit 151 and the touch pad are disposed as a layered structure to form a touchscreen as previously described, the display unit 151 may be used as an input device that allows a user to input information by touch in addition to an output device.

The acoustic output module 153 outputs audio data received from the wireless communication unit 110 or stored in the memory 160. The acoustic output module 153 may include a speaker and a buzzer.

The alarm unit 155 outputs a signal to inform generation of an event of the mobile terminal 100. For example, the alarm unit 155 may output a signal in the form of vibration.

The haptic module 157 generates various tactile effects that a user can feel. A typical example of the tactile effects generated by the haptic module 157 is a vibration effect.

The memory 160 may store a program for processing or control of the controller 180, or may temporarily store input or output data (for example, phonebooks, messages, still images, moving images, etc.).

The interface unit 170 interfaces between the mobile terminal 100 and all external devices connected to the mobile terminal 100. The interface unit 170 may receive data or power from the external devices, and may transmit the received data or power to the respective components of the mobile terminal 100. In addition, data from the mobile terminal 100 may be transmitted to the external devices via the interface unit 170.

The controller 180 generally controls operations of the respective components of the mobile terminal 100, thereby controlling overall operation of the mobile terminal 100. For example, the controller 180 may perform control or processing for voice communication, data communication, and video communication. In addition, the controller 180 may include a multimedia reproduction module 181 to reproduce multimedia. The multimedia reproduction module 181 may be incorporated into the controller 180 in the form of hardware. Alternatively, the multimedia reproduction module 181 may be configured in the form of software separately from the controller 180. Meanwhile, the operation of the controller 180 for multimedia reproduction will hereinafter be described in detail with reference to FIG. 27.

The power supply unit 190 supplies external power or internal power to the respective components of the mobile terminal 100 under control of the controller 180.

The mobile terminal 100 with the above-stated construction may be configured such that the mobile terminal 100 can be operated in a communication system that is capable of transmitting data through frames or packets, including a wired or wireless communication system and a satellite-based communication system.

Meanwhile, the block diagram of FIG. 26 shows components constituting the mobile terminal 100 according to the embodiment of the present invention. The respective components in the block diagram may be integrated, added, or omitted according to the specifications of an actually implemented mobile terminal 100. That is, two or more components may be combined into a single unit as needed, or one component may be divided into two or more components as needed. In addition, functions performed by the respective blocks are illustrated to describe the embodiment of the present invention, and therefore concrete operations or devices of the respective blocks do not restrict the right scope of the present invention.

Figure 27:
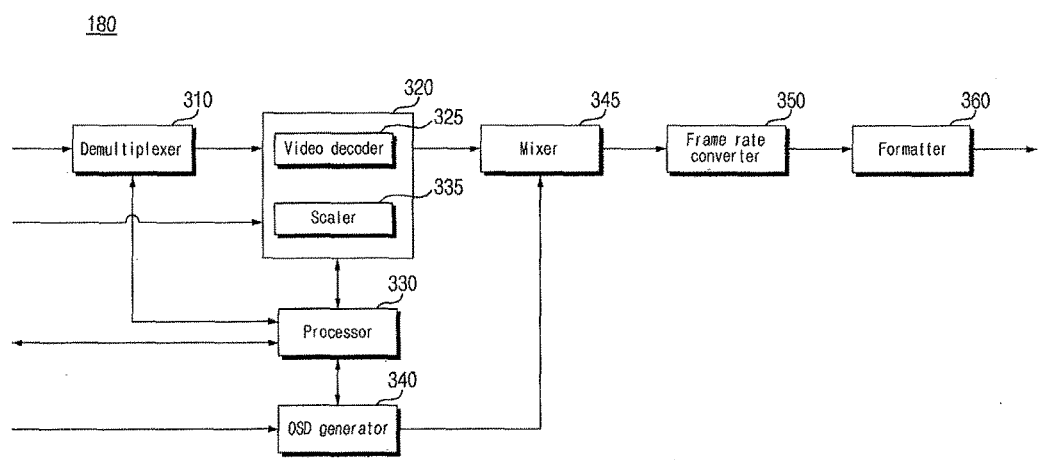
FIG. 27 is an internal block diagram showing a controller of FIG. 26.

FIG. 27 is an internal block diagram showing the controller of FIG. 26.

Referring to the figure, the controller 180 according to the embodiment of the present invention may include a demultiplexing unit 310, an image processing unit 320, a processor 330, an on screen display (OSD) generation unit 340, a mixer 345, a frame rate converter 350, and a formatter 360 for multimedia reproduction. In addition, the controller 180 may further include an audio processing unit (not shown) and a data processing unit (not shown).

The demultiplexing unit 310 may demultiplex an input stream. For example, in a case in which an MPEG-2 TS is input, the demultiplexing unit 310 may demultiplex the input MPEG-2 TS into image, voice, and data signals. The stream signal input to the demultiplexing unit 310 may be a stream signal output from the broadcast receiving module 111, the wireless Internet module 115, or the interface unit 170.

The image processing unit 320 may perform image processing with respect to the demultiplexed image signal. To this end, the image processing unit 320 may include an image decoder 225 and a scaler 235.

The image decoder 225 decodes the demultiplexed image signal, and the scaler 235 may scale the resolution of the decoded image signal in consideration of an image output from the display unit 151.

The image decoder 225 may include decoders of different standards.

The processor 330 may control overall operation of the mobile terminal 100 or the controller 180. For example, the processor 330 may control the broadcast receiving module 111 to tune to a radio frequency (RF) broadcast corresponding to a channel selected by a user or a previously stored channel.

In addition, the processor 330 may control the mobile terminal 100 according to a user command input through the user input unit 130 or an internal program.

In addition, the processor 330 may control data transmission to a network interface unit 135 or the interface unit 170.

In addition, the processor 330 may control operations of the demultiplexing unit 310, the image processing unit 320, and the OSD generation unit 340 in the controller 180.

The OSD generation unit 340 generates an OSD signal according to a user input or even without a user input. For example, the OSD generation unit 340 may generate a signal to display various kinds of information in the form of graphs or text in an image output to the display unit 151 based on a user input signal. The generated OSD signal may include various kinds of data, such as a user interface screen, various menu screens, widgets, and icons of the mobile terminal 100. In addition, the generated OSD signal may include 2D objects or 3D objects.

The mixer 345 may mix the OSD signal generated by the OSD generation unit 340 with the image signal decoded through image processing of the image processing unit 320. The mixed image signals are transmitted to the frame rate converter 350.

The frame rate converter (RFC) 350 may convert a frame rate of the input image. On the other hand, the frame rate converter 350 may directly output the input image without frame rate conversion.

The formatter 360 may receive the signals mixed by the mixer 345, i.e. the OSD signal and the decoded image signal, may change formats of the signals so that the signals are suitable for the display unit 151, and may output the signals, the formats of which have been changed.

In addition, the formatter 360 may divide a 2D image signal and a 3D image signal from each other for 3D image display. In addition, the formatter 360 may change the format of the 3D image signal, or may convert the 2D image signal into the 3D image signal.

Meanwhile, the formatter 360 may use the distance information calculated by the distance detection unit 200 during 3D image display. Specifically, when the size of a distance information level is large, which means that an external target is distant, the formatter 360 may set a depth information level to low. That is, the formatter 360 may set the depth information level such that the depth information level is inversely proportional to the distance information level. In addition, the formatter 360 may change a 2D image into a 3D image using the depth information, and may output the 3D image.

When the external target is distant and thus the distance information level is high, therefore, the formatter 360 may set the depth information level to low such that the external target is depressed during 3D image display. On the other hand, when the external target is near and thus the distance information level is low, the formatter 360 may set the depth information level to high such that the external target protrudes during 3D image display.

Meanwhile, the audio processing unit (not shown) in the controller 180 may perform voice processing with respect to the demultiplexed voice signal. To this end, the audio processing unit (not shown) may include various decoders.

In addition, the audio processing unit (not shown) in the controller 180 may adjust bass, treble, and volume.

Meanwhile, in FIG. 27, the signals from the OSD generation unit 340 and the image processing unit 320 are mixed by the mixer 34 and are 3D processed by the formatter 360. However, the present invention is not limited thereto. For example, the mixer may be disposed after the formatter. That is, the output of the image processing unit 320 may be 3D processed by the formatter 360, the OSD generation unit 340 may perform 3D processing together with OSD generation, and the respectively processed 3D signals may be mixed by the mixer 345.

Meanwhile, the block diagram of FIG. 27 shows components constituting the controller 180 according to the embodiment of the present invention. The respective components in the block diagram may be integrated, added, or omitted according to the specifications of an actually implemented controller 180.

In particular, the frame rate converter 350 and the formatter 360 may not be disposed in the controller 180 but may be separately provided.

Constructions and methods of the embodiments as previously described are not limited to the image processing apparatus including the distance detecting device according to the embodiment of the present invention. All or some of the embodiments may be selectively combined so that the embodiments can be variously modified.

It will be apparent that, although the preferred embodiments have been shown and described above, the present invention is not limited to the above-described specific embodiments, and various modifications and variations can be made by those skilled in the art without departing from the gist of the appended claims. Thus, it is intended that the modifications and variations should not be understood independently of the technical spirit or prospect of the present invention.

INDUSTRIAL APPLICABILITY

The present invention is applicable to a distance detecting device that is capable to detecting the distance to an external target.

The invention claimed is:
1. A distance detecting device comprising:
a light source configured to output light based on a plurality of transmission signals having different frequencies;
a scanner configured to sequentially perform first direction scanning and second direction scanning to output the output light to an external area;
a detection unit including a photodiode to convert light received from an outside into reception signals, the received light corresponding to the output light; and
a processor configured to calculate a distance to an external target based on the transmission signals and the reception signals, the processor varying frequencies of the transmission signals,
wherein the processor calculates a first distance to the external target based on a first transmission signal, selected from among the transmission signals, and a first reception signal corresponding to the first transmission signal, calculates a second distance to the external target based on a second transmission signal, selected from among the transmission signals, and a second reception signal corresponding to the second transmission signal, and calculates a final distance to the external target based on the calculated first and second distances, wherein the processor divides a scanning section of the external area into a blank area that does not include the external target and an active area that includes the external target, and wherein, when levels of the detected reception signals are equal to or greater than a predetermined level in a state in which the output light is not output to the outside in a portion of the scanning section corresponding to the blank area, in which the external target is not present, the processor determines that another distance detecting device uses frequencies similar to the frequencies of the transmission signals and varies the frequencies of the transmission signals.

2. The distance detecting device according to claim 1, wherein a frequency ratio between the first and second transmission signals, selected from among the transmission signals, is not an integer multiple.

3. The distance detecting device according to claim 1, wherein a frequency ratio between the first and second transmission signals, selected from among the transmission signals, is n +0.5.

4. The distance detecting device according to claim 1, wherein a first output light based on the first transmission signal, selected from among the transmission signals, and a second output light based on the second transmission signal, selected from among the transmission signals, are simultaneously output, the first output light and the second output light having the same wavelength.

5. The distance detecting device according to claim 1, wherein a first output light based on the first transmission signal, selected from among the transmission signals, and a second output light based on the second transmission signal, selected from among the transmission signals, are simultaneously output, the first output light and the second output light having different wavelengths.

6. The distance detecting device according to claim 1, wherein a first output light based on the first transmission signal, selected from among the transmission signals, and a second output light based on the second transmission signal, selected from among the transmission signals, are alternately output per line or per frame during scanning performed by the scanner.

7. The distance detecting device according to claim 1, wherein the processor calculates the final distance to the external target based on a greatest common measure frequency of a first frequency of the first transmission signal and a second frequency of the second transmission signal.

8. The distance detecting device according to claim 1, wherein the light source outputs light based on the first transmission signal and the second transmission signal, selected from among the transmission signals, for a first time, and outputs light based on a third transmission signal and a fourth transmission signal, selected from among the transmission signals, for a second time.

9. The distance detecting device according to claim 1, wherein, when a frequency variable input is made based on a user input, the processor varies the frequencies of the transmission signals.

10. The distance detecting device according to claim 1, further comprising:
a modulation unit configured to modulate at least one code signal and to drive the light source to output light based on at least one code signal; and
a demodulation unit including a frequency conversion unit to convert a carrier-based electric signal detected by the detection unit into a baseband-based signal and configured to separate the code signal based on light received from the outside, the received light corresponding to the output light, wherein the processor detects the distance to the external target based on the code signal for the modulation unit and the code signal for the demodulation unit.

11. The distance detecting device according to claim 1, further comprising:
a polarized beam splitting unit disposed between the light source and the scanner and between the detection unit and the scanner in a light traveling path of the output light to transmit a polarized beam of the output light and the received light and to reflect another polarized beam of the output light and the received light; and
an absorption member configured to absorb a backscattered light generated in the polarized beam splitting unit.

12. The distance detecting device according to claim 11, wherein the absorption member comprises at least one selected from among:
a black painting attached to the polarized beam splitting unit;
a polarizing member disposed between the polarized beam splitting unit and the light source;
a photosensitive filter disposed between the polarized beam splitting unit and a structure;
a black coating formed at a surface of the structure; and
a multiple-reflection channel member attached to the structure.

13. The distance detecting device according to claim 1, wherein the processor detects the distance to the external target based on a time difference between the code signal for the modulation unit and the code signal for the demodulation unit.

14. The distance detecting device according to claim 1, wherein the processor selects a code signal corresponding to the code signal used in the modulation unit from among at least one code signal separated by the demodulation unit using a correlation value between the code signal used in the modulation unit and the at least one code signal separated by the demodulation unit, and detects the distance to the external target based on a time difference between the selected code signal and the code signal used in the modulation unit.

15. The distance detecting device according to claim 1, wherein the light source outputs light having a single wavelength, the modulation unit adds a plurality of code signals to the output light having the single wavelength, or adds a first code signal, selected from among the code signals, to the output light having the single wavelength, and the output light having the first code signal, selected from among the code signals, added thereto is output for a first period, and an output light having a second code signal, selected from among the code signals, added thereto is output for a second period.

16. The distance detecting device according to claim 1, wherein the light source comprises a first light source configured to output a first light having a first wavelength and a second light source configured to output a second light having a second wavelength, and a first code signal, selected from among a plurality of code signals, is added to the first output light, and a second code signal, selected from among the code signals, is added to the second output light.

17. The distance detecting device according to claim 15, wherein the processor detects a plurality of pieces of distance information to the external target based on the code signals for the modulation unit and the code signals for the demodulation unit, and calculates final distance information based on the pieces of distance information.

18. An image processing apparatus comprising:
a display unit;
a distance detecting unit comprising a light source configured to output light based on a plurality of transmission signals having different frequencies, a scanner configured to sequentially perform first direction scanning and second direction scanning to output the output light to an external area, a detection unit configured to convert light received from an outside into reception signals, the received light corresponding to the output light, and a processor configured to calculate a distance to an external target based on the transmission signals and the reception signals, the processor varying frequencies of the transmission signals; and
a controller configured to control a three-dimensional (3D) image to be displayed on the display unit using distance information detected by the distance detecting unit; and
a memory to store a program for processing or controlling the controller,
wherein the processor calculates a first distance to the external target based on a first transmission signal, selected from among the transmission signals, and a first reception signal corresponding to the first transmission signal, calculates a second distance to the external target based on a second transmission signal, selected from among the transmission signals, and a second reception signal corresponding to the second transmission signal, and calculates a final distance to the external target based on the calculated first and second distances,
wherein the processor divides a scanning section of the external area into a blank area that does not include the external target and an active area that includes the external target, and
wherein, when levels of the detected reception signals are equal to or greater than a predetermined level in a state in which the output light is not output to the outside in a portion of the scanning section corresponding to the blank area, in which the external target is not present, the processor determines that another distance detecting device uses frequencies similar to the frequencies of the transmission signals and varies the frequencies of the transmission signals.

* * * * *